United States Patent
Minkin et al.

(10) Patent No.: US 6,826,698 B1
(45) Date of Patent: Nov. 30, 2004

(54) SYSTEM, METHOD AND COMPUTER PROGRAM PRODUCT FOR RULE BASED NETWORK SECURITY POLICIES

(75) Inventors: Ilya Minkin, Los Altos, CA (US); Igor V. Balabine, Cupertino, CA (US); Gerhard Eschelbeck, Peuerbach (AT)

(73) Assignee: Networks Associates Technology, Inc., Santa Clara, CA (US)

( * ) Notice: Subject to any disclaimer, the term of this patent is extended or adjusted under 35 U.S.C. 154(b) by 841 days.

(21) Appl. No.: 09/663,863

(22) Filed: Sep. 15, 2000

(51) Int. Cl.[7] .............................................. G06F 11/30
(52) U.S. Cl. ..................... 713/201; 713/200; 713/201; 713/153; 713/165; 713/166; 713/167; 709/223; 709/225; 709/232
(58) Field of Search ............................ 713/200–201, 713/153, 165–167; 709/223, 225, 232

(56) References Cited

U.S. PATENT DOCUMENTS

| | | | |
|---|---|---|---|
| 5,826,014 A | 10/1998 | Coley et al. ........... 395/187.01 |
| 5,898,830 A | 4/1999 | Wesinger, Jr. et al. .. 395/187.01 |
| 5,950,195 A * | 9/1999 | Stockwell et al. ............. 707/4 |
| 5,968,176 A * | 10/1999 | Nessett et al. .............. 713/201 |
| 5,983,270 A * | 11/1999 | Abraham et al. ............. 709/224 |
| 6,052,788 A | 4/2000 | Wesinger, Jr. et al. ...... 713/201 |
| 6,061,798 A | 5/2000 | Coley et al. ................. 713/201 |
| 6,098,172 A * | 8/2000 | Coss et al. .................. 713/201 |
| 6,154,775 A * | 11/2000 | Coss et al. .................. 709/225 |
| 6,170,012 B1 * | 1/2001 | Coss et al. .................. 709/229 |
| 6,173,364 B1 * | 1/2001 | Zenchelsky et al. ........ 711/118 |
| 6,182,226 B1 * | 1/2001 | Reid et al. ................... 713/201 |
| 6,301,669 B2 * | 10/2001 | Boden et al. ................ 713/201 |
| 6,327,618 B1 * | 12/2001 | Ahlstrom et al. ........... 709/223 |
| 6,453,419 B1 * | 9/2002 | Flint et al. ................... 713/201 |
| 6,473,763 B1 * | 10/2002 | Corl et al. ................... 707/101 |
| 6,473,851 B1 * | 10/2002 | Plutowski ....................... 713/1 |
| 6,484,261 B1 * | 11/2002 | Wiegel ........................ 713/201 |
| 6,519,636 B2 * | 2/2003 | Engel et al. ................. 709/223 |
| 6,578,076 B1 * | 6/2003 | Putzolu ....................... 709/223 |
| 6,598,034 B1 * | 7/2003 | Kloth ........................... 706/47 |
| 6,601,082 B1 * | 7/2003 | Durham et al. ............. 718/100 |
| 6,643,778 B1 * | 11/2003 | Nakazawa ................... 713/201 |
| 6,691,168 B1 * | 2/2004 | Bal et al. ..................... 709/238 |
| 6,691,232 B1 * | 2/2004 | Wood et al. ................. 713/201 |

* cited by examiner

Primary Examiner—Gregory Morse
Assistant Examiner—Tongoc Tran
(74) Attorney, Agent, or Firm—Zilka-Kotab, PC; Kevin J. Zilka; Christopher J. Hamaty

(57) ABSTRACT

A system, method and computer program product are provided for affording network security features. A plurality of network objects are identified. Rule sets associated with one or more of the identified network objects are retrieved. Each rule set includes a plurality of policy rules that govern actions relating to the identified network objects. Overlapping policy rules of the rule sets are reconciled amongst the network objects. The reconciled rule sets are executed. A computer program product and a method are also provided for establishing network security. A plurality of network objects of a network and a plurality of rule sets are provided. The network objects are associated with the rule sets. The rule sets include a plurality of policy rules that govern actions relating to the identified network objects during operation of the network.

26 Claims, 16 Drawing Sheets

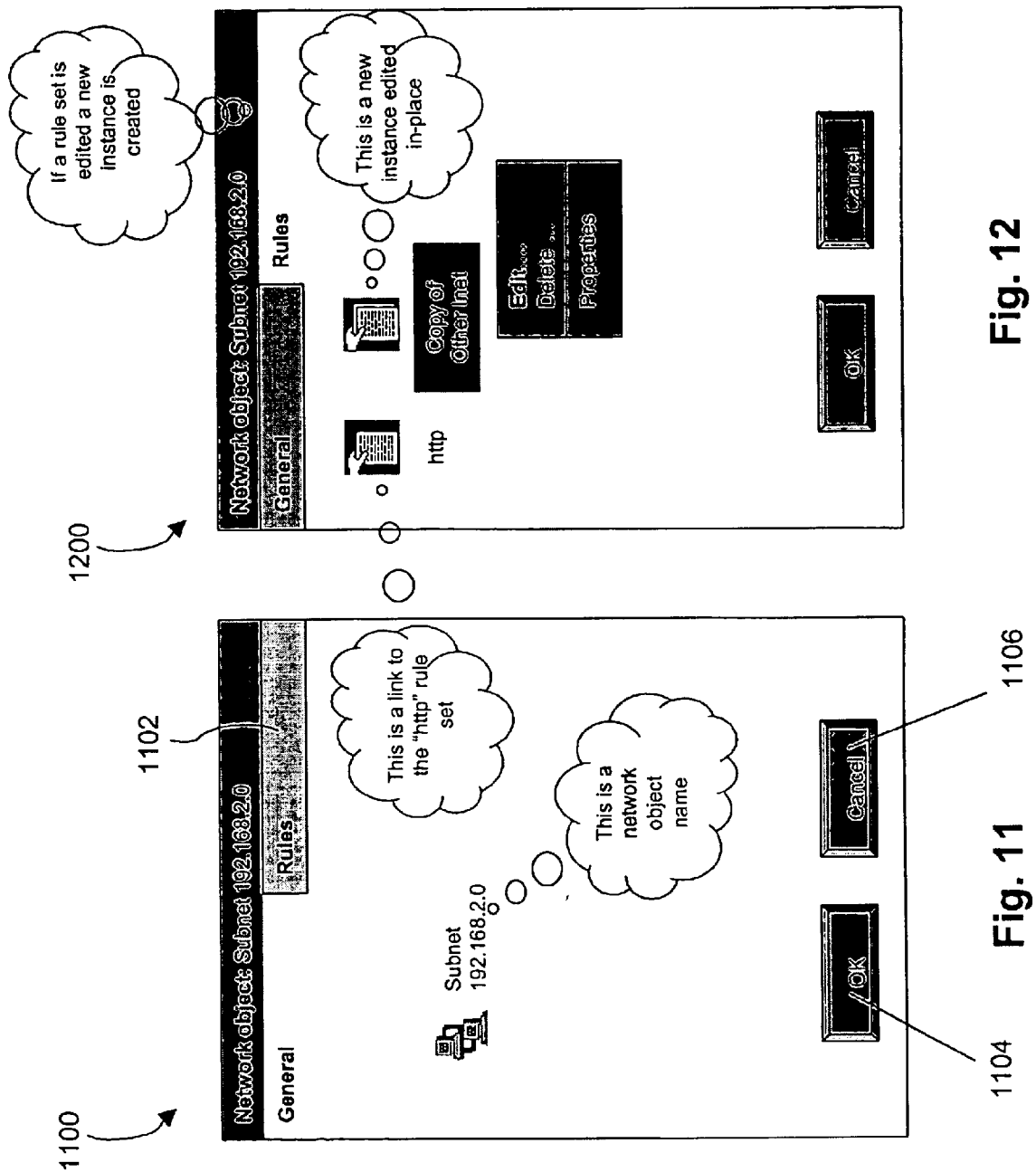

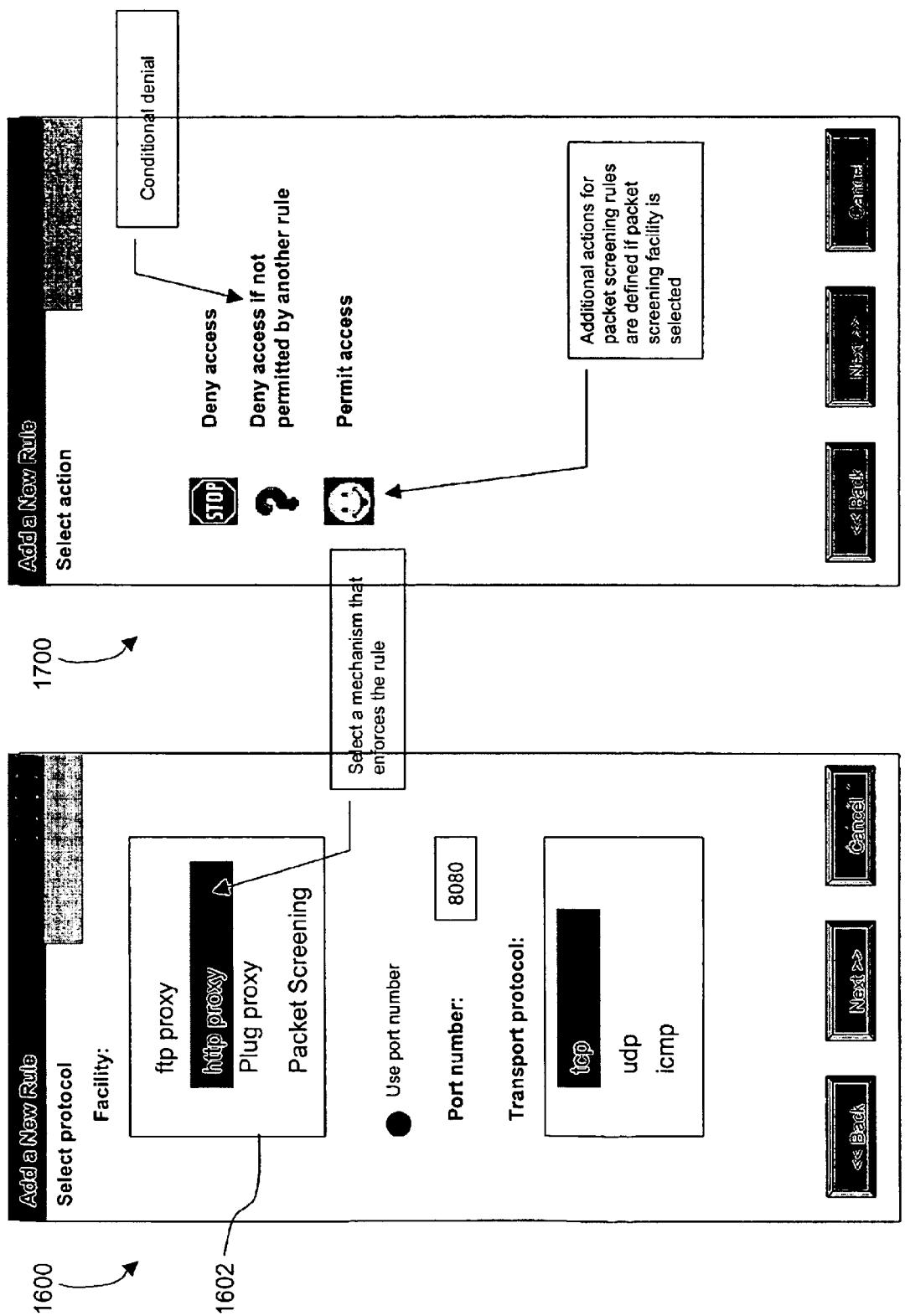

SYSTEM, METHOD AND COMPUTER PROGRAM PRODUCT FOR RULE BASED NETWORK SECURITY POLICIES

FIELD OF THE INVENTION

The present invention relates to network security, and more particularly to utilizing rule sets associated with network objects for providing network security.

BACKGROUND OF THE INVENTION

One of the most significant parts of any firewall configuration is what actions are permitted or denied. The decision is based on an action's parameters such as connection source and destination IP address and host name, user name or group a user belongs to, etc. The current version of the GAUNTLET firewall, as well as other firewalls, uses some variation of "sequential" evaluation approach. Rules are combined in a table or a tree. For every new connection, the firewall searches rule space to find the rule that matches the connection's parameters.

The big limitation of this approach is the inability to support multiple group memberships in any meaningful fashion. It also fails to present a coherent view of configuration in case multiple group membership is present. A common example of multiple group membership is where a user belongs to more than one user group.

With the source based approach, a policy map specifies the IP addresses and the IP ranges that are evaluated sequentially at run time. First, a matching entry is used to retrieve the policy. The policy determines whether the connection should be permitted or denied. For permitted connections each policy contains proxy configuration parameters such as anti-virus on/off, the handoff host address, welcome prompt, etc. IP packet screening exists as an independent facility. The packet-screening rules are evaluated from top to bottom and the first rule that matches is used. The packet screening rules have priority over the policy rules enforced by the proxies.

The advantages of the traditional approach are described immediately above are:
  This methodology is very simple and is well understood by administrators of the firewall.
  Each policy presents a coherent view of what is permitted or denied for a given source object.
On the other hand, the existing method has significant flaws:
  Network policies cannot be applied to individual users or user groups.
  Sequential search in a monolithic policy table does not allow policies that reflect a user's membership in multiple user groups.
  Firewall configuration is complicated because packet-screening policies are separated from the proxy policies.

Other approaches to configuration management also exist in the prior art. Firewalls, such as CHECKPOINT, WINGATE and RAPTOR firewalls use what can be loosely described as the "Decision Tree" based approach. The basic building blocks are logical expressions and actions. Logical expressions are evaluated from top to bottom and the first matching expression becomes the enforced policy. Logical expressions may contain source, destination, user name, user group, protocol, time and any combinations of those. The "Decision Tree" may have a single level as in the CheckPoint firewall ("Decision List") or multiple levels as in the WinGate firewall.

The "Decision Tree" approach presents the following advantages:
  The methodology is flexible. For example, a configuration could be built to emphasize destinations rather than the source as main criteria.
  User group based policies are supported.
The disadvantages of the "Decision Tree" approach are:
  The model does not allow viewing all rules per a given network object.
  Incorrect or incorrectly placed rule can have a negative impact on other rules and in some cases can leave the firewall severely misconfigured.
  Multiple user group membership is limited in its scope and can be made meaningful only by carefully tweaking logical expressions. Adding a user to another group may require adding a new expression to the "Decision Tree" to provide the necessary policy evaluation branch.

There is thus a need for a new method of rule set creation and evaluation.

SUMMARY OF THE INVENTION

A system, method and computer program product are provided for affording network security features. A plurality of network objects are identified. Rule sets associated with one or more of the identified network objects are retrieved. Each network object can have one or more rule sets associated with it. Each rule set includes a plurality of policy rules that govern actions relating to the identified network objects. Overlapping policy rules of the rule sets are reconciled amongst the network objects. The reconciled rule sets are then executed.

In one preferred embodiment, each policy rule of the reconciled rule sets includes a rule action. One rule action permits an action relating to the identified network objects. Another rule action denies an action relating to the identified network objects. Yet another rule action conditionally denies an action relating to the identified network objects. Preferably, an action relating to the identified network objects is permitted if no policy rules deny the action, at least one policy rule conditionally denies the action, and at least one policy rule permits the action. As an option, the policy rules denying the action are evaluated first and the policy rules conditionally denying the action are evaluated second. The policy rules permitting the action are evaluated third.

In another preferred embodiment, an action relating to the identified network objects is denied if none of the policy rules permit the action. Further, an action relating to the identified network objects can be denied if none of the policy rules match a request for the action.

As an option, the rule sets can be combined into a single rule set during execution of the reconciled rule sets. As another option, duplicate policy rules of the rule sets can be removed. Preferably, a user such as an administrator of the system or network is notified of conflicting policy rules of the rule sets so that appropriate correction can be made. Further, a protocol configuration enforced by a related proxy can be selected from a hierarchal list if an action is permitted by more than one rule.

In another aspect of a preferred embodiment, a computer program product and a method are provided for establishing network security. A plurality of network objects of a network and a plurality of rule sets are provided. The network objects are associated with the rule sets. The rule sets include a plurality of policy rules that govern actions relating to the identified network objects during operation of the network.

In one preferred embodiment, a user is allowed to associate the network objects with the rule sets via a graphical user interface. In another preferred embodiment, each policy rule of the reconciled rule sets includes a rule action. One rule action permits an action relating to the identified network objects. Another rule action denies an action relating to the identified network objects. Yet another rule action condition ally denies an action relating to the identified network objects. Preferably, an action relating to the identified network objects is permitted if no policy rules deny the action, at least one policy rule conditionally denies the action, and at least one policy rule permits the action. As an option, an action relating to the identified network objects can be denied if none of the policy rules permit the action.

BRIEF DESCRIPTION OF THE DRAWINGS

FIG. 11 depicts a graphical user interface displayed upon selection of a network object on the graphical user interface of FIG. 10;

FIG. 12 shows a graphical user interface displayed upon selection of the rules tab of FIG. 11;

FIG. 16 illustrates a graphical user interface for configuring a new rule to a rule set;

FIG. 17 illustrates a graphical user interface for configuring a new rule to a rule set;

DESCRIPTION OF THE PREFERRED EMBODIMENTS

Figure 1:
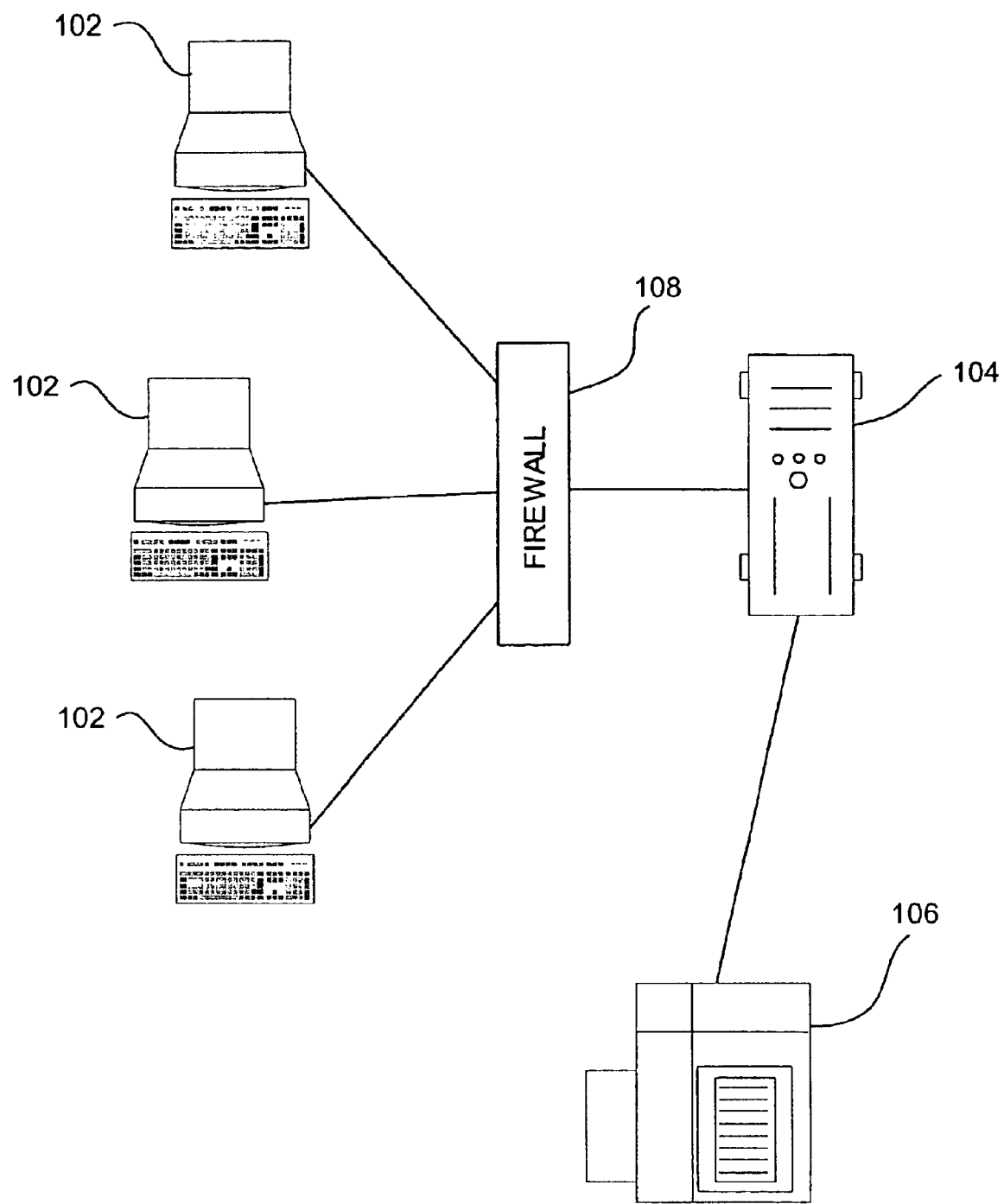
FIG. 1 illustrates a network'system in accordance with various embodiments of a preferred embodiment.

FIG. 1 illustrates a network system 100 in which a preferred embodiment can be implemented. As shown in FIG. 1, several user terminals 102 are connected to a central server 104. Other network objects such as a printer 106 can also be connected to the server 104. A firewall 108 provides network security.

Figure 2:
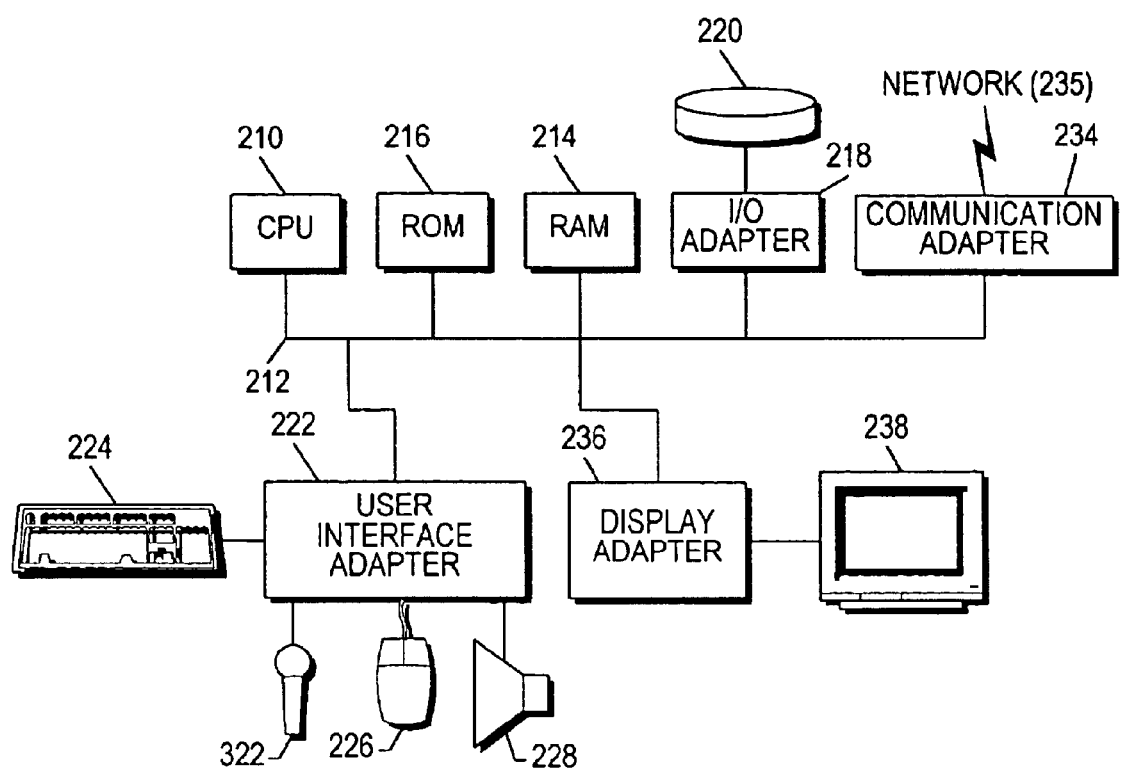
FIG. 2 shows a representative hardware environment on which the various components of FIG. 1 may be implemented.

A representative hardware environment on which the network server and/or terminals of FIG. 1 may be implemented is depicted in FIG. 2. Such figure illustrates a typical hardware configuration of a workstation in accordance with a prefected embodiment having a central processing unit 210, such as a microprocessor, and a number of other units interconnected via a system bus 212. The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows NT or Windows/95 Operating System (OS), the IBM OS/2 operating system, the MAC OS, or UNIX operating system. It will be appreciated that a preferred embodiment may also be implemented on platforms and operating systems other than those mentioned. A preferred embodiment may be written using JAVA, C, and/or C++ language, or other programming languages, along with an object oriented programming methodology. Object oriented programming (OOP) has become increasingly used to develop complex applications.

A broad aspect of a preferred embodiment provides a new way of rule set creation and evaluation. Accordingly, rule sets and objects are viewed as unordered collections rather than traditional tables or trees. Administrator can assign rule sets to network objects. At run time the firewall will try to find every network object that can represent connection and will retrieve and evaluate every rule set for all applicable network objects in order to come up with an answer.

The approach to firewall configuration according to the various preferred embodiments described herein preferably allows:

creation of meaningful and reusable rule sets that specify the access rights representation of Network Objects as an unordered set rather than an ordered list or a tree the ability to merge multiple rule sets with the result consistent with the Administrator's expectations the ability to make policy changes without unexpected side effects caused by ordered evaluation the ability to fine tune access rights for subsets of the larger Network Objects by specifying additional rules valid for the subset only the ability to support backward compatibility with the existing GAUNTLET Firewall configurations.

Figure 3:
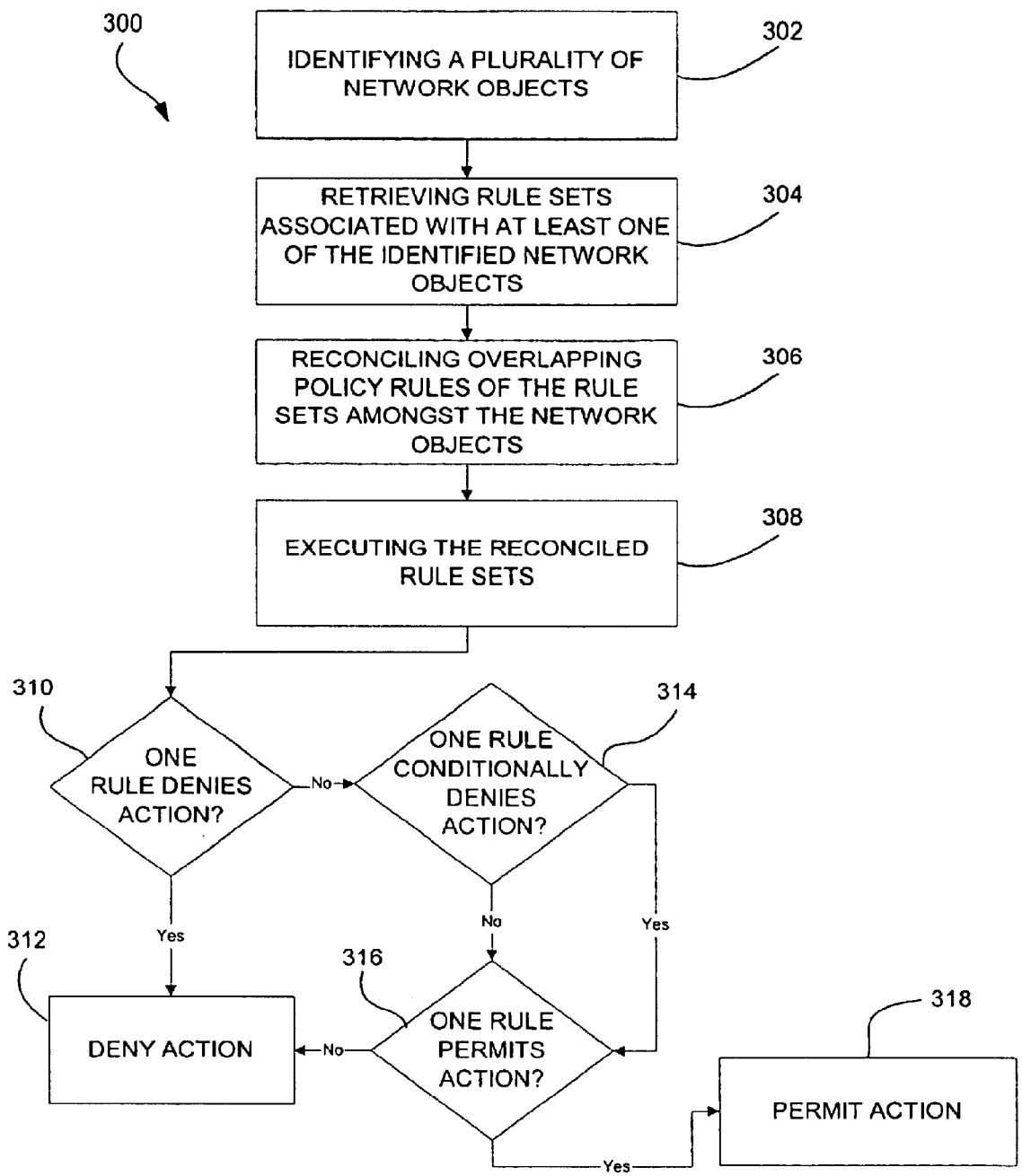
FIG. 3 shows a process for providing network security features according, to one preferred embodiment.

FIG. 3 is a flowchart of a process 300 for providing network security features according to one preferred embodiment. In operation 302, a plurality of network objects are identified. Rule sets associated with one or more of the identified network objects are retrieved in operation 304. Each network object can have one or more rule sets associated with it. Each rule set includes a plurality of policy rules that govern actions relating to the identified network objects. In operation 306, overlapping policy rules of the rule sets are reconciled amongst the network objects. The reconciled rule sets are executed in operation 308.

In one preferred embodiment, each policy rule of the reconciled rule sets includes a rule action. One rule action permits an action relating to the identified network objects. Another rule action denies an action relating to the identified network objects. Yet another rule action conditionally denies an action relating to the identified network objects. It should be noted that such an action includes accessing the associated network object.

With continued reference to FIG. 3, the rules are analyzed in operations 310, 314, and 316. In operation 310, a determination is made as to whether any of the rules deny the action. If any of the rules deny the action, the action is denied in operation 312. In operation 314, it is determined whether any of the rules conditionally deny the action, upon which a determination is made in operation 316 as to whether any of the rules permit the action. If no rule permits the action, the action is denied. If one rule permits action, the action is permitted in operation 318.

In the preferred embodiment, the policy rules denying the action are evaluated first (operation 310) and the policy rules conditionally denying the action are evaluated second (operation 314). The policy rules permitting the action are evaluated third (operation 316).

As shown, an action relating to the identified network objects is permitted if no policy rules deny the action, at least one policy rule conditionally denies the action, and at least one policy rule permits the action. The action is denied if none of the policy rules permit the actions relating to the identified network objects. The action can also be denied if there are no policy rules that match a request for the actions relating to the identified network objects.

As an option, the rule sets can be combined into a single rule set during execution of the reconciled rule sets. As another option, duplicate policy rules of the rule sets can be removed. Preferably, a user such as a system or network administrator is notified of conflicting policy rules of the rule sets so that appropriate correction can be made. Further, a protocol configuration enforced by a related proxy can be selected from a hierarchal list if an action is permitted by more than one rule.

Figure 4:
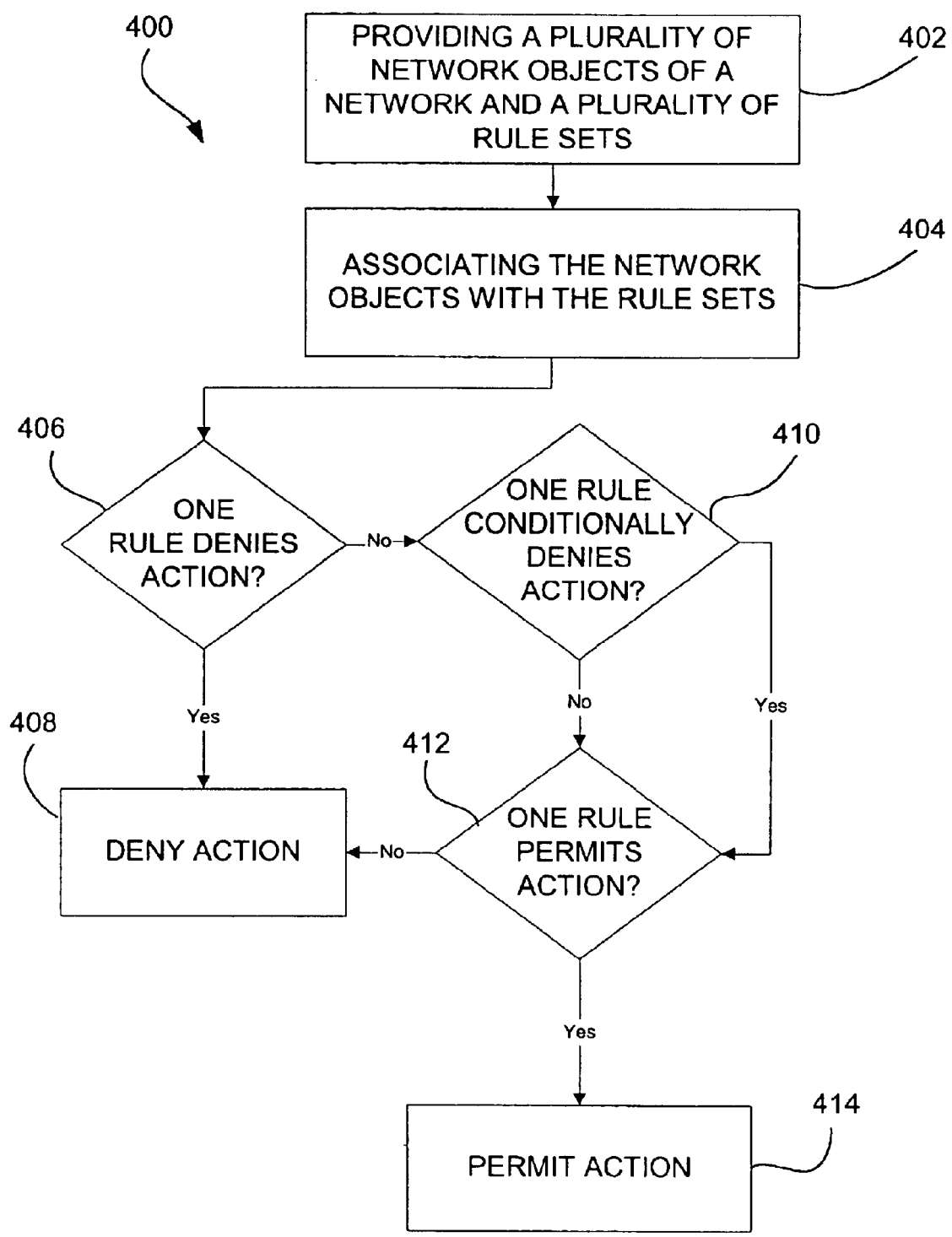
FIG. 4 depicts a process for establishing network security according to a preferred embodiment.

FIG. 4 depicts a process 400 for establishing network security. In operation 402, a plurality of network objects of a network and a plurality of rule sets are provided. The network objects are associated with the rule sets in operation 404. A user can be allowed to associate the network objects with the rule sets via a graphical user interface, as described below in the section entitled User Interface for Network Security Configuration, or the associations can be generated automatically according to predefined parameters. The rule sets include a plurality of policy rules that govern actions relating to the identified network objects during operation of the network.

Again, each policy rule of the reconciled rule sets can include a rule action. One rule action permits an action relating to the identified network objects. Another rule action denies an action relating to the identified network objects. Yet another rule action conditionally denies an action relating to the identified network objects.

With continued reference to FIG. 4, the rules are analyzed in operations 406, 410, and 412. In operation 406, a determination is made as to whether any of the rules deny the action. If any of the rules deny the action, the action is denied in operation 408. In operation 410, it is determined whether any of the rules conditionally deny the action, upon which a determination is made in operation 412 as to whether any of the rules permit the action. If no rule permits the action, the action is denied. If one rule permits action, the action is permitted in operation 414.

Preferably, an action relating to the identified network objects is permitted if no policy rules deny the action, at least one policy rule conditionally denies the action, and at least one policy rule permits the action. As an option, an action relating to the identified network objects can be denied if none of the policy rules permit the actions.

The various preferred embodiments are ideally implemented utilizing the GAUNTLET Firewall security program manufactured by PGP Security, a subsidiary company of Network Associates, Inc. located at 3965 Freedom Circle, Santa Clara, Calif. 95054.

Network Security Policy

A network security policy is a collection of rules for allowing and disallowing a specific type of the network traffic by the network objects under specific conditions. A network security policy is established by applying a set of rules to the network topology. The network is presumed to be comprised of the network objects. For the purposes of the network policy a network object is defined as any identifiable network entity such as:

- network objects: an IP address, a subnet, an IP address range
- Authenticated network objects: a user whose location on the network could be determined, a user group
- Any combination of the above objects associated using the logical OR and the logical AND operations
- The Firewall object. See the section below entitled Matching Communications Request with the Rules for a description of this network object
- Firewall Interfaces. See the section below entitled Matching Communications Request with the Rules for a description of these network objects
- "Other" network object. See the section below entitled The Default Network Topology for a description of this network object and collections thereof.

The purpose of a network security policy is to protect the enterprise informational resources based on the proper computer and network use. The local network policy is developed by a network administrator and covers all types of the network traffic for each network object at the enterprise under all operational conditions.

Policy Components

The network security policy is expressed using the policy rules or simply rules. Each rule is a predicate that answers a simple question: "Is network object O accessible using network protocol P at this time?"

Each network policy rule statement is preferably comprised of a network destination object or objects, one or more communications protocols used to access the network object, validity time interval (i.e., the time period for which the rule is valid), a command statement ("permit," "deny," "conditional deny") stating the action taken if the source network object requests access to the network destination object using the communications protocol, and/or the protocol configuration if the destination could be accessed using this network protocol (if the rule permits the access).

The rules are combined in the rule sets. The rule sets are associated with the network objects to construct a network security policy.

For example, a rule statement that prohibits access to all destinations in domains d1.com and d2.com is written as:

dest=*.d1.com, *.d2.com; prot=*; deny

A formal definition of a policy rule is (in augmented BNF):

```
policy-rule = * (policy-rule-component";") action
policy-rule-component = dest-comp | prot-comp |
   time-comp
dest-comp = "d[estination]" "=" * (dest-value)
prot-comp = "p[rotocol]" "=" * (prot-name [":" port-
   number])
time-comp = begin-time "-" end-time
dest-value = "*" | host-name | numeric-ip-addr |
   ip-addr-range
numeric-ip-addr = numeric-ip-host-addr | numeric-
   ip-net-addr
ip-addr-range = numeric-ip-host-addr "-" numeric-
   ip-host-addr
numeric-ip-net-addr = numeric-ip-addr ["("numeric-
   ip-addr-mask")"]
prot-name = "*" | "telnet" | "http" | . . .
port-number = number
begin-time = HTTP-date
end-time = HTTP-date
action = "permit" <protocol-configuration> |
   "deny" | "?deny"
```

Figure 5:
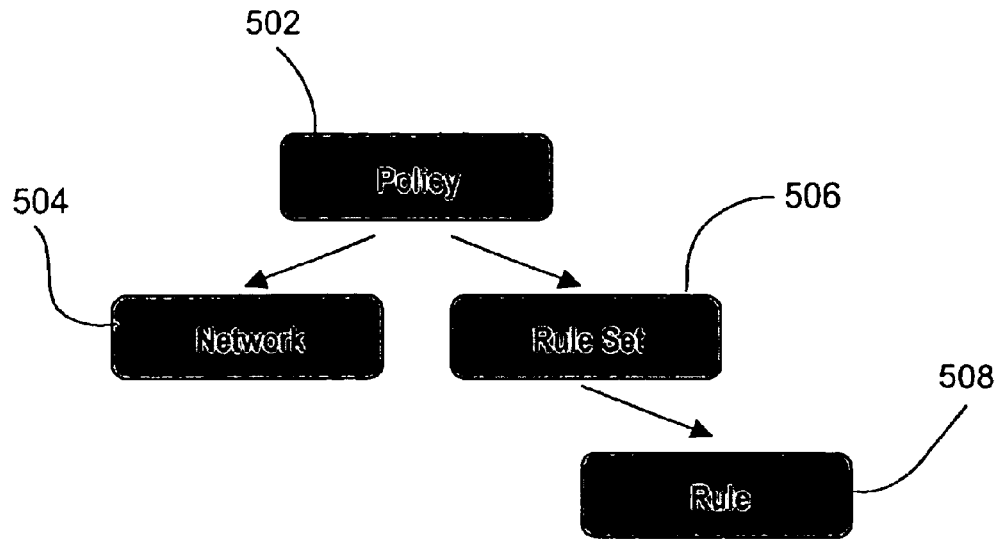
FIG. 5 illustrates the relationship between the network policy, network objects, rule sets, and rules.

The relationship between the network policy, network objects, rule sets, and rules are presented on FIG. 5. As shown, the network policy elements include a policy 502, a network object 504, a rule set 506, and a rule 510.

Rule Action Verbs

Network policy rules may contain the following action verbs:

Permit
 a rule containing this action verb permits access under certain operational conditions Deny
 a rule containing this action verb denies access under all operational conditions ?deny
 a rule containing this action verb denies access under certain operational conditions In a standalone rule set the "deny" and the "?deny" actions are equivalent and mean that the action is denied. The difference between these two action verbs is notable when the decision has to be made based on two or more rule sets. For more information see the section entitled Competing Policy for Multi-Valued Sources.

Evaluating Rules in a Rule Set

For the configuration approach described here, the Windows NT access control list can be used: the rules in a rule set are evaluated using Windows NT access control algorithms. The adoption of the Windows NT approach makes it easier for the Administrator who is already trained to manage Windows domain resources to learn how to configure the GAUNTLET firewall.

The rules in the rule set are evaluated sequentially using the "first fit" principle starting with the rules containing the "deny" action followed by the rules containing the conditional "?deny" action verb. The rules containing the "permit" action are evaluated next. If none of the rules in the rule set matches the request then the implicit "deny other" rule is applied.

For the rules with destinations presented as the numeric IP addresses or ranges of the numeric IP addresses a different evaluation criterion is applied. First, the "permit" rule set is searched for a rule that has a network object with the exact IP address as its destination. If such rule is present, then the protocol configuration specified with this rule is used by the proxy for this connection. If the rule with the exact matching destination IP address is not found, then a list of all proxy configurations associated with the rules that include the destination IP address, except the '*' destination, is built. If no matching IP ranges are found, the protocol configuration associated with the '*' destination is used.

For named destinations the matching FQDN (Fully Qualified Domain Name, RFC 2109) is equivalent to IP address, the domain names containing the wild card symbol "*" are equivalent to IP ranges. This is an advanced feature that requires reverse DNS lookup.

If more than one protocol configuration is selected, the result is chosen from the list of the selected protocol configurations according to the selection order established by the Administrator. See the section entitled Resolving Network Protocol Configuration for more information on the protocol configuration selection. The Administrator does not need to sort rules in a proper order when she creates a rule set. The rules are rearranged automatically when the network policy is compiled. This feature applies also to the case when more than one rule set is combined when associated with a single network object.

Figure 6:
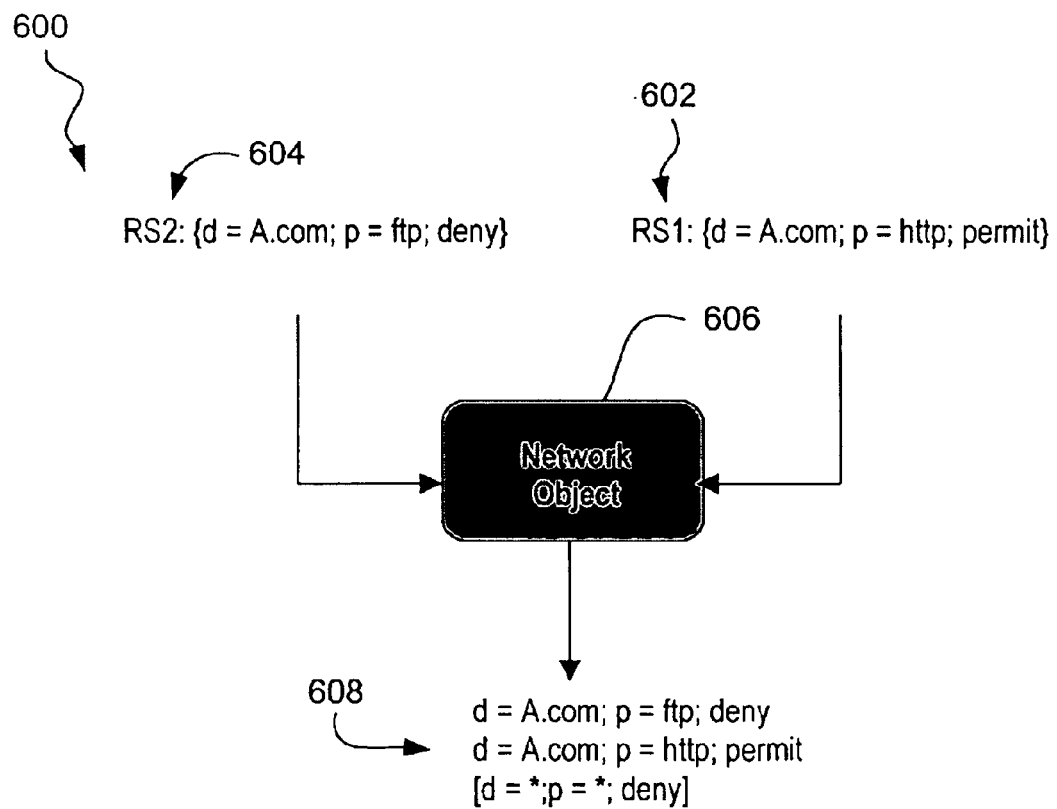
FIG. 6 illustrates a process of combining multiple rule sets according to one preferred embodiment.

The ability to define the network topology and rule sets independently of each other is a significant advantage of the preferred embodiment FIG. 6 illustrates an exemplary process 600 of combining multiple rule sets. In this example, the Administrator defines rule sets 602, 604 for the http and the ftp protocol separately and applies both rule sets to one network object 606. The resulting rule set 608 is computed as a superposition of the applied rule sets. Note that the "deny" rules are moved to the top of the combined rule set according to the rule set evaluation order.

When a new aggregate rule set is created, all duplicate rules are merged in a single rule. Rules that match exactly except the action verb are contradictory and cannot be merged in an aggregate rule set. The Policy Builder should bring this matter to the Administrator's attention and refuse to create a contradictory rule set. For example, the following two rules are contradictory:

d=A.com; p=smtp; permit d=A.com; p=smtp; deny and cannot be merged in a single rule set.

Another possible approach to specifying the rule set is to ask the Administrator to sort the "permit" rules in the desired fashion. This approach disallows applying more that one rule set to a network object.

Associating Rule Sets with the Network Objects

Each network could be presented as a collection of the network objects. In order to create a network policy the Administrator associates one or more rule sets with some of the network objects present on the network. The rules contained in the rule set define the network object's access rights to other network objects. The default rule "deny all" is applied to the network objects for which network policy rules sets were not applied explicitly.

Figure 7:
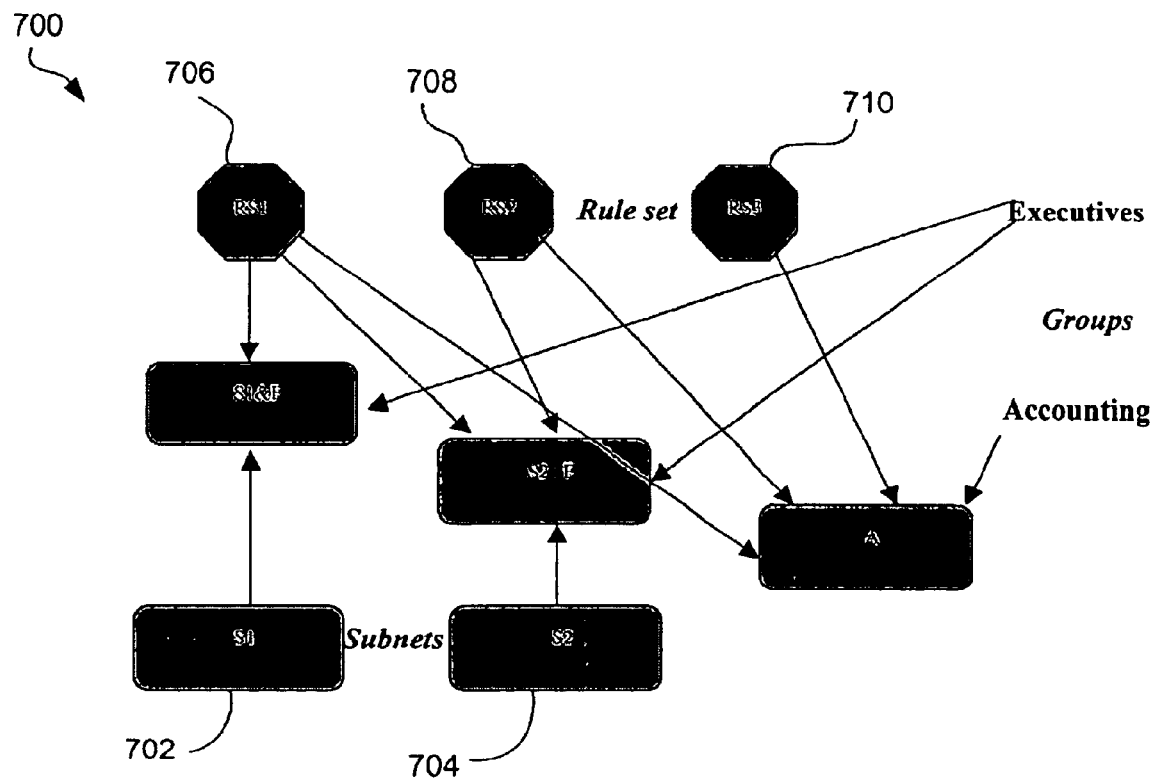
FIG. 7 depicts an example of a network with associated security policy rules sets.

An example of a network 700 with associated security policy rules sets are presented on FIG. 7. The network is physically comprised of the three subnets denoted as S1 702, S2 704, and S3 (not shown). There are two user groups defined called "Executives" and "Accounting" and denoted E and A respectively. One may assume that only Executives have access to the computers on the S1 subnet.

The Administrator creates three rule sets:

```
RS1:
{
    d = *; p = http; permit
    d = *; p = ftp; permit
}
RS2: {d = b.com; p = http; deny}
RS3: {d = c.com; p = http; deny}
```

The Administrator created the following three network objects for which the network security policy is enforced and applied to them the above rule sets RS1 706, RS2 708, and RS3 710:

RS1 & RS2 & RS3→S3|A:
By applying rule set RS3 and rule set RS2 to object S3 the Administrator prohibits access to the destinations in the C.com and B.com domains for all http connections that are initiated from the S3 subnet or by any user in the Accounting group no matter from which host he starts the communications session.

RS1 & RS2→S2|E:
Rule set RS2 prohibits all users which do not belong to the Accounting or the Executive group from accessing destinations at the B.com domain using the http protocol. The Administrator prohibits the Executives working from the machines in the S2 domain from accessing that site as well so that other employees cannot oversee the information viewed by the Executives.

RS1→S1 & E:
The S1 subnet is used exclusively by the Executives working from their private computers. Even if any other employee outside of the Executives group gains physical access to a computer on the S1 subnet, she cannot access the sites at the B.com domain.

When the rule set is applied to a network object the rule statements in the rule set are ordered according to the rule set evaluation algorithm.

Computing Policy for Multi-Valued Sources

Managing network objects that span multiple network object groups is a challenging task. Traditional policy management methods avoid dealing with this problem. The task of computing the policy rule for a multi-valued source arises when, for example, the user belongs to more than one user group. For example, Bob is a Manager in the Engineering department. If the Managers have a set of privileges different from that of the Engineers, then what of the two rule sets define the policy applied to the Bob's request? See the section entitled Matching Communication Request with the Rules below for a complete list of multi-valued sources.

If the policy rule is computed from more than one rule set then a two step evaluation process is applied. Initially, the applicable policy rule is selected from each rule set under consideration. The rule is selected using the rule selection procedure described in the section entitled Evaluating Rules in a Rule Set above. The computation in each rule set yields a rule with one of the action verbs defined in the section entitled Rule Action Verbs above. In addition, some of the rule sets may contain no matching rule for the given request and yield the implicit "deny all" rule located past the last "permit" rule in the rule set. For computing the final rule, the implicit "deny all" action is interpreted as the decision delegation to other rule sets under consideration.

After each individual rule set yielded an appropriate rule, the policy rule is selected using operational table presented below. In Table 1, P denotes rule sets that yielded a rule containing the "permit" verb, D denotes rule sets containing the "deny" verb, d denotes rule sets containing the "?deny" (conditional deny) verb, Ø denotes rule sets that yielded the implicit "deny all" rule.

TABLE 1

| The number of rule sets that yielded a P rule | The number of rule sets that yielded a Ø rule | The number of rule sets that yielded a D rule | The number of rule sets that yielded a ?D rule | Enforced rule |
|---|---|---|---|---|
| >0 | Any | 0 | any | P |
| any | Any | >0 | any | D |
| 0 | Any | 0 | >0 | D |
| 0 | Any | 0 | 0 | D |

The selection process of the policy rule could be expressed verbally as:

The access is permitted if none of the rule sets yielded an explicit denial and one or more of the yielded rules contain permission. The access is denied otherwise.

The following example demonstrates the policy computation. Bob is a manager in the Engineering department and is placed by the Administrator in both the Managers and the Engineers user groups. The Managers group has the following rule set associated with it:

```
RS_M
{
    d = *; p = http; permit         // M1
    d = *; p = ftp; deny            // M2
    d = *; p = smtp; permit         // M3
}
```

The Engineering group is governed by the following policy rule set:

```
RS_E
{
    d = *.A.com; p = http; deny     // E1
    d = *; p = http; permit         // E2
    d = *; p = ftp; permit          // E3
}
```

When Bob accesses a Web site in the A.com domain rule set $RS_M$ yields rule M1 and rule set $RS_E$ yields rule E1 that contains the "deny" action and Bob's request is denied.

If the Administrator rewrite the E rule set as:

```
RS_E
{
    d = *.A.com; p = http; ?deny    // E1
    d = *; p = http; permit         // E2
    d = *; p = ftp; permit          // E3
}
``` replacing the explicit "deny" action with the conditional "?deny" action, then Bob's connection is established because rule E1 with the conditional "?deny" action is overridden by rule M1 containing the "permit" action. On the other hand Bob's request to establish ftp connections are still denied according to rules M2 and E3.

As a member of the Managers group Bob also can send e-mail messages since rule set E does not contain any rule for regarding the smtp protocol. The members of the Engineers group are denied access to e-mail since rule set E implicitly denies smtp requests.

Access is permitted only when there is an explicit permit rule and there is no explicit deny rule. Action word "deny", introduced in a previous section, creates an explicit deny rule. Action words "permit" and "?deny" together define explicit permit rules where "?deny" is limiting the scope of "permit" rule that follows.

To illustrate the difference between denied actions and not-permitted actions, another hypothetical case is set forth. Engineers have access to some super-secret information and because of that should not be able to access e-mail to prevent them from accidentally or on purpose disclosing this information to someone else. Managers have access to personal files and can use e-mail. Engineers are not permitted access to personal files. Managers have no access to secret information. As expressed in rule sets:

```
RS1
{
    e-mail; deny
    secret info; permit
}
```

```
RS2
{
    e-mail; permit
    personal info; permit
}
```

Engineers→RS1
Managers→RS2

There is no need to deny access to secret information for Managers and to personal information to Engineers because it is not permitted and as such is implicitly denied. Now, what happens to an Engineering Manager? He gets access to both secret information and personal information, however, access to secret information implies no e-mail access and that is achieved by explicitly denying e-mail access to the Engineers.

Matching Communications Request with the Rules

In order to determine the policy, data in the communications request is matched to one or more network objects. The rule sets associated with the selected network objects yield a decision if the connection should be permitted or denied and what configuration should be used if the connection is permitted.

The incoming communications request contains the following parameters on which the policy decision is made:
1. source IP address
2. source user name and user groups to which the user belongs
3. destination IP address
4. network protocol Data items (1), (3), and (4) are immediately available when a regular TCP connection is being established. The value in the field (2) is derived from the user name or the user id. The user name (id) is available for the network protocols supporting user authentication (http, ftp, SMB) and for the users of the GAUNTLET Single Sign-On (SSO) facility.

The proposed model suggests the mechanism of the explicit network objects to allow the Administrator to quickly amend the existing network policy. When creating a network object the Administrator may wish to designate a network object as explicit. Rule sets associated with the explicit network objects that reference the network object contained in the request are evaluated first. This feature allows the Administrator a fine grain of immediate control over the existing network policy.

In order to make a policy decision regarding the communications request, a collection of rule sets that influence the outcome is assembled.

For each incoming connection the following happens:
1. Select all explicit network objects with associated rule sets that match connection request;
2. If some are selected stop the search and go to step 6;
3. Continue the search in the remaining network objects with associated rule sets;
4. If some are selected stop the search and go to step 6;
5. Select the "Other" object with its rule set;
6. Select relevant interface network object with its rule set;
7. Add the rule set for the firewall network object;

After the applicable rule sets are selected, the decision is made according to the algorithm described above in the section entitled Computing Policy for Multi-Valued Sources.

The Policy Database Structure

A record in the Policy Database consists of a 4-tuple, an action, and a network protocol configuration object if the action value is "permit":
  db-src-addr-value
  db-src-user-group-name
  dest-value
  prot-name
  action [prot-config-object]

Figure 8:
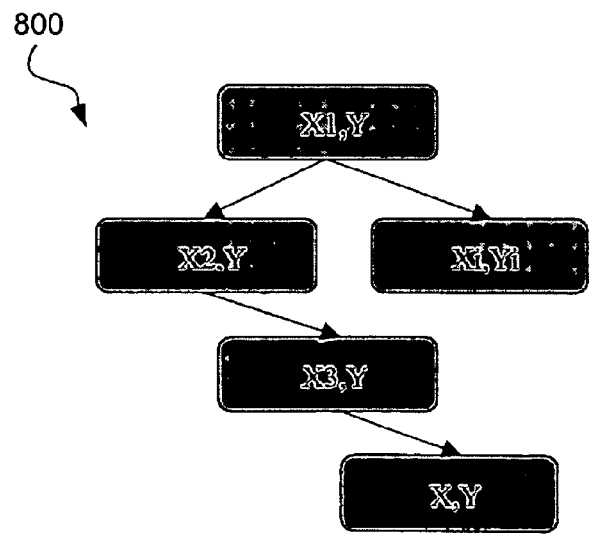
FIG. 8 demonstrates the process of inserting a new node in a policy database according to one preferred embodiment.

The Policy Database is organized in a structure known as the k-d tree. The k-d tree is a specialized structure designed for storing multi-valued objects such as vectors. Insertion of a new element in the k-d tree is done by evaluating each subsequent vector coordinate against the corresponding coordinate of the current tree node. FIG. 8 demonstrates the process 800 of inserting a new node in a k-d tree of a two dimensional vector $(x, y)$, $x, y \in R$. At the root node the first coordinate, $x$, is compared with the value of the first coordinate in the node, $x1$, and the traversal direction is selected depending on the outcome of this comparison. If $x<x1$, then the next evaluated node is $(x2, y2)$. Here the second vector coordinate, $y$, is compared with the second coordinate of the node, $y2$. If $y>y2$, the next evaluated node becomes node $(x3, y3)$. The first coordinate, $x$, is compared now with the first coordinate of this node, $x3$. If $x>x3$, then vector $(x, y)$ is inserted as the right child of the leaf node $(x3, y3)$.

The Policy Database k-d tree is built only once when the user-friendly representation of the network security policy is compiled. At the run time the search for the matching object in the Policy Database could be minimized by balancing the tree structure.

Resolving Network Protocol Configuration

Network protocol configuration is an important part of the rule. Network protocol configuration defines the constraints on the requestor's ability to perform the actions allowed by a network protocol. Network protocol configuration is enforced by the respective proxy agent. For example, the http proxy could be configured either to perform or not to perform anti-virus scanning of the retrieved data for a particular request depending on the http protocol configuration associated with the request.

The problem of selecting a protocol configuration arises when a communications request is granted by two or more "permit" rules statements at the same time. This may happen, for example, if the requestor belongs to two or more user groups, each of which is allowed to access a certain network object but under different constraints specified by the network protocol configuration. The same problem may be solved when the source IP address of the connection belongs to the intersection of two or more IP address ranges.

The resolution of the protocol configuration collision is done through a hierarchy of the preferred network protocol configurations created by the Administrator. When specifying the protocol configurations, the Administrator creates an ordered list of those. At the run-time a network protocol configuration with the highest priority assigned by the Administrator is selected from the list of the protocol configurations in the result rule set.

This approach to selecting the network protocol configuration allows selecting a proper configuration using a set of statically defined objects—a measure that speeds up the process of the decision making.

A combination protocol configuration can be computed by combining settings from all configurations. In order to provide the ability to compute a combination configuration each network protocol configuration item is associated with a respective object that defines the configuration item setting restriction level. The presence of the constraints metering object allows to compare two generic configuration settings and to select the least restrictive option setting. When queried, the constraints metering object returns an integer value in the range between 0 and N. The value of 0 corresponds to the least restrictive setting and the value of N denotes the most restrictive setting of the configuration parameter. For example, in case of the virus scanning, the query on this configuration parameter for the constraints metering returns 0 for the configuration where virus scanning is not required and the value of 1 for the configuration setting that requires virus scanning. The range of the returned values could be arbitrary long for multi-valued configuration parameters. The restriction neutral configuration parameter constraints metering object returns same value independent of the actual parameter setting.

The dynamic approach that combines statically defined network protocol configurations requires more computational power but, on the other hand, allows creating highly flexible policies and solves the problem of the configuration ordering for the Administrator.

The Default Network Topology

The default network topology forms the basis of any network policy. The following network objects constitute the default topology:

The Firewall object

The Firewall Interfaces

The "Other" network object

The Firewall object and the interface objects are evaluated for all requests that traverse the Firewall. The "Other" object represents all network objects that the Administrator did not introduce individually or as an element of other network objects. A rule set associated with the "Other" network object governs these objects behavior.

Impact on the Existing Proxy and Driver Implementation

The proposed approach has little impact on proxies. Only implementation of the API used to retrieve proxy configuration has to change. There are three options/stages how the GAUNTLET driver is introduced to the new configuration management style:

a. No change initially. Packet screening rules are not a part of the rule sets.

b. Rule sets containing packet-screening rules are not applied to the user group network objects. The driver adopts the new way of rule set evaluation but uses only IP network objects.

c. The proposed network management model is fully supported by the driver.

CONFIGURATION EXAMPLES

Following is a definition of proxy configurations that will be used throughout the examples.

HTTP

HTTP1 (allow everything)

HTTP2 (allow everything anti-virus on)

HTTP3 (deny Java & ActiveX)

HTTP4 (use handoff to inside web server)

FTP

FTP1 (allow everything)

FTP2 (use handoff to inside server)

Other proxies will follow this scheme.

Example 1

A Simple Configuration

Inside subnet, connected to firewall interface IF1, is allowed to go out with a number of protocols, outside access, on IF2, is allowed to inside FTP and Web server through handoff.

The rule sets for this configuration:

```
RS1
{
d = *; p = HTTP; permit <HTTP1>
d = *; p = FTP; permit<FTP1>
d = <DNS server IP address>; p = DNS; permit
    <forward with reply>
... other protocols
}
```

```
RS2
{
d = <FW IP>; p = HTTP; permit <HTTP4>
d = <FW IP>; p = FTP; permit<FTP2>
}
```

Create the inside network object

```
NO1
{
161.69.56.0:255.255.255.0
}
```

NO1←RS1

"Others"←RS2 or

IF1←RS1

IF2←RS2

Example 2

In Addition to Example 1 Some Inside Machines Need Access to SQL and Port 1111/TCP

```
RS3
{
    d = *; p = SQL, permit<SQL1>
    d = *; p = 1111/TCP; permit <forward with reply>
}
```

```
NO2
{
    161.69.56.23, 161.69.56.33, 161.69.56.99
}
```

NO1←RS1

"Other"←RS2

NO2←RS3

For connections originated from one of NO2 IP addresses RS1 and RS3 are applied, for other inside connection only RS1 is used as before. Note, that one does not need to find any particular spot for NO2, nor does one have to duplicate RS1 in RS3.

Example 3
Same as Example 2 But Additional Access is Granted to Members of User Group 1 (UG1)

NO1←RS1

"Other"←RS2

UG1←RS3

Example 4
Explicit Deny Rule

```
RS1
{
    d = *; p = HTTP; permit<HTTP1>
}
```

```
RS2
{
    d = *; p = HTTP; deny
}
```

UG1←RS1

UG2←RS2

User1←UG1 permitted HTTP

User2←UG2 denied HTTP

User3←UG1+UG2 denied HTTP

Because HTTP is explicitly denied in RS2 it means "deny HTFP access to any member of this group even if other groups he belongs to allow HTP". If deny rule is removed from RS2 then the result is User1←UG1 permitted HTTP User2←UG2 denied HTTP (no permit rule is found)

User3←UG1+UG2 permitted HTTP (does not have explicit deny rule anymore, has permit rule)

Example 5
Conditional vs. The Explicit Deny Rule

```
RS1
{
    d = *.website.com; p = HTTP; ?deny
    d = *; p = HTTP; permit<HTTP1>
}
```

```
RS2
{
    d = *; p = HTTP; permit<HTTP1>
}
```

UG1←RS1

UG2←RS2

User1←UG1 permitted HTTP anywhere except *.website.com

User2←UG2 permitted HTTP anywhere

User3←UG1+UG2 permitted HTTP anywhere

Because conditional deny is used in RS1 the meaning of RS1 can be expressed as "permit HTTP to any destination except *.website.com". If conditional deny is replaced with explicit deny the result changes to:

User1←UG1 permitted HTTP anywhere except *.website.com

User2←UG2 permitted HTTP anywhere

User3←UG1+UG2 permitted HITP anywhere except *.website.com

Example 6
Conflicting "Permit" Statements

```
RS1
{
    d = *; HTTP; permit<HTTP2>
}
```

```
RS2
{
    d = *; HTTP; permit<HTTP3>
}
```

UG1←RS1

UG2←RS2

User1←UG1 permitted HTTP with configuration HTTP2

User2←UG2 permitted HTTP with configuration HTTP3

User3←UG1+UG2 with configuration HTTP2, because it has a higher preference set by the Administrator IP Network Objects and SSO Authentication Each IP network object should have authentication attribute set by the Administrator. It should be possible to set authentication to:

allow SSO authentication;

prohibit SSO authentication (a subnet if Unix workstations);

User Interface for Network Security Configuration

Figure 9:
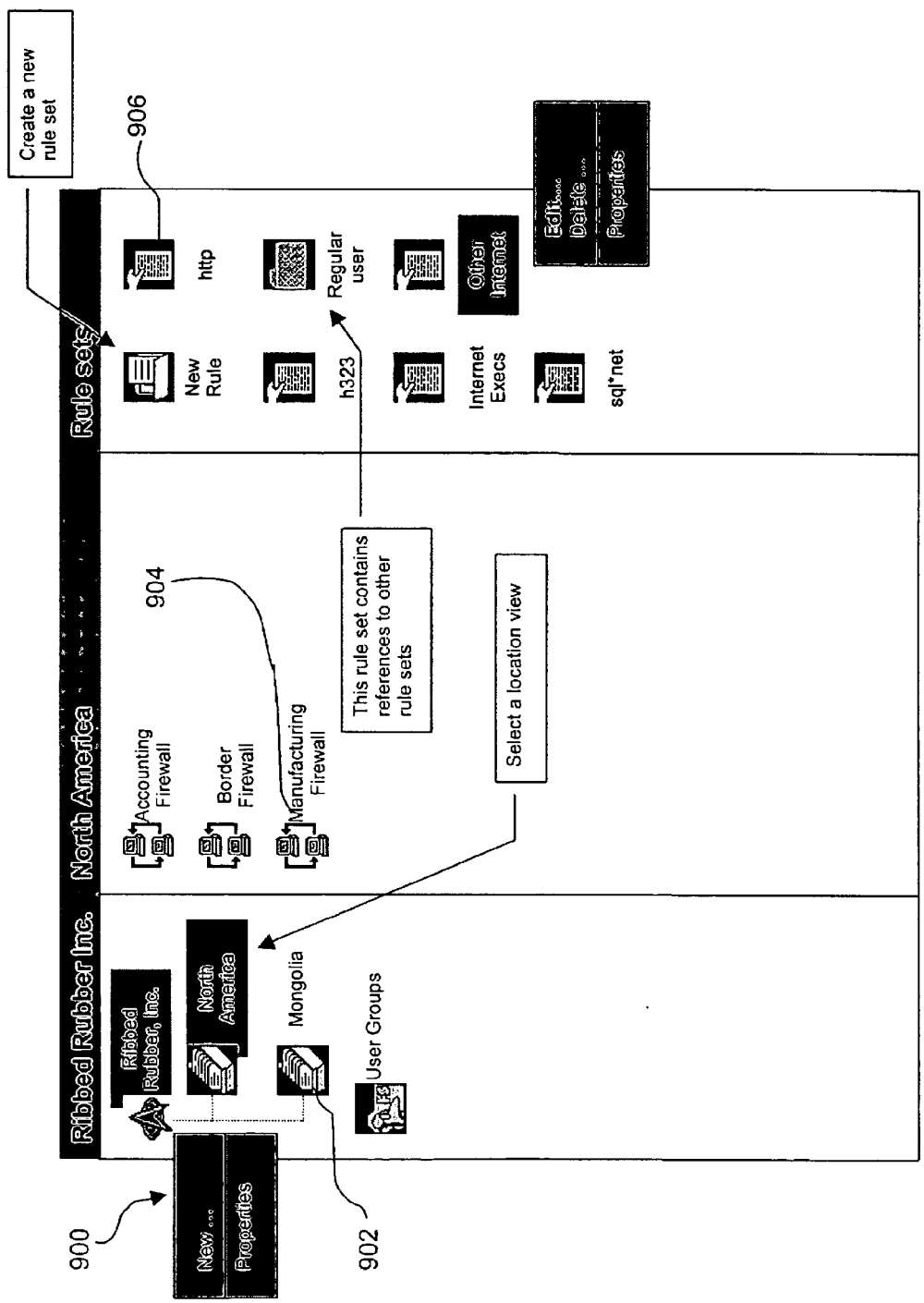
FIGS. 9 illustrates a graphical user interface that allows a user to associate network objects with rule sets.

FIGS. 9–23 illustrate graphical user interfaces (GUIs) that allow a user such as an Administrator to associate network objects with rule sets across an enterprise. For example, see the discussion with reference to FIG. 4, above, for a description of a process for establishing network security that can be performed with the graphical user interfaces described herein. As shown on the screen 900 of FIG. 9, various location icons 902 of an enterprise are shown. The user is allowed to select a particular location icon to display security features, such as firewall icons 904 and rule set icons 906, of that location. Because each rule set is a shared resource, each location can have several firewalls that each use the rules from the rule sets. On this screen, the user is allowed to create new rule sets for an entire location and modify existing rule sets. By right clicking on a particular icon, for example, a menu is displayed that allows the user to create, edit and/or delete the objects, items or rules represented by the icon.

Figure 10:
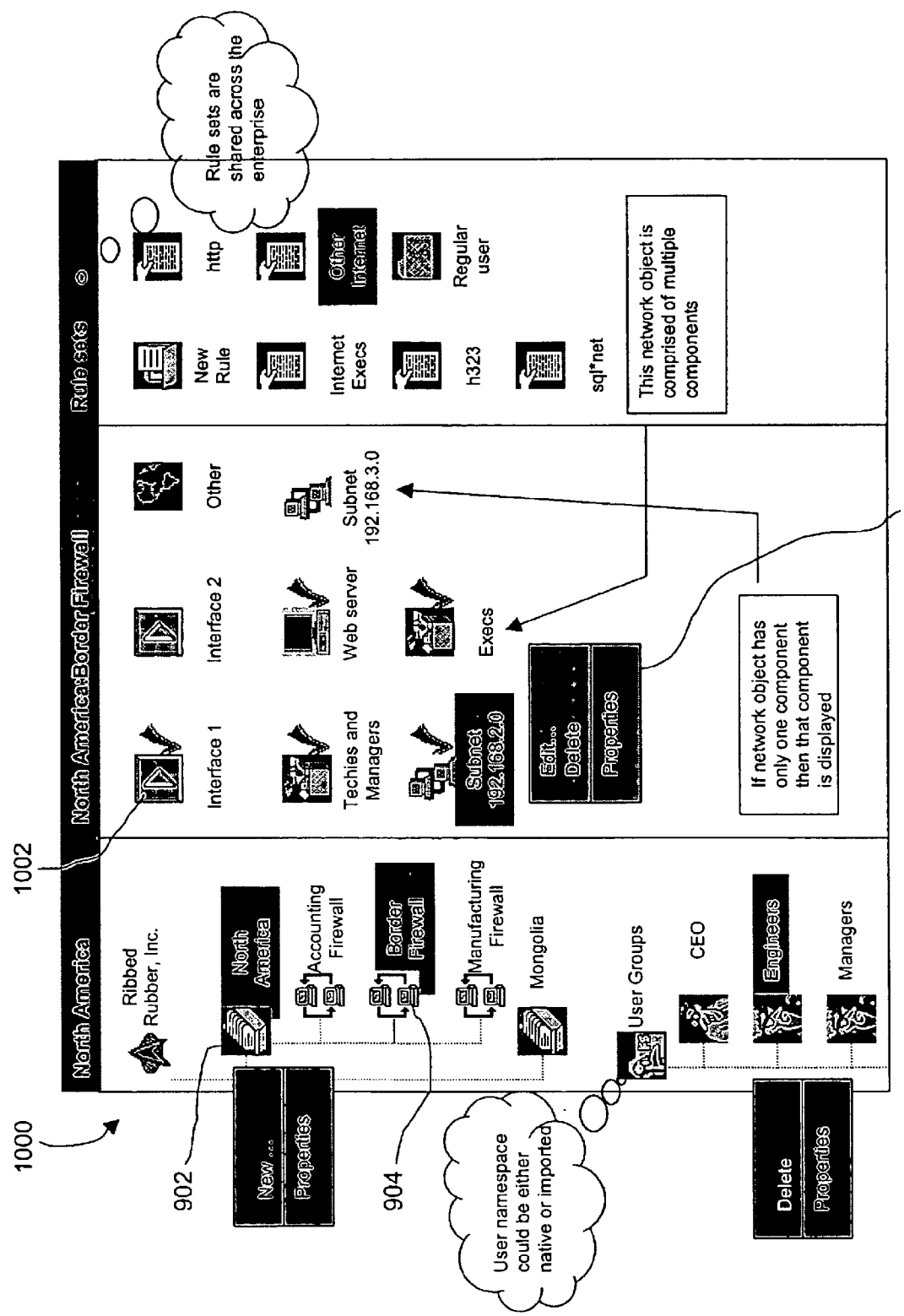
FIG. 10 illustrates a graphical user interface that allows a user to create associations of rule sets and objects for a particular firewall.

FIG. 10 illustrates a screen 1000 that allows a user to create associations of rule sets and objects. As shown, the user selects a particular firewall icon and icons 1002 representing network objects or groups of network objects are displayed. Each icon representing a group of objects should be denoted in some manner. Here, such icons representing a group of objects are denoted by a check mark. Again, right clicking on an object icon displays a menu 1004.

FIG. 11 depicts a screen 1100 displayed upon selection of a network object, such as by selecting the "Properties" or "Edit" item of a menu of the icon representing the network object. See FIG. 10. The screen displays the object or objects represented by the object icon. Upon selection of the OK button 1104, changes are saved. Selecting the Cancel button 1106 exits the screen without saving changes. It should be noted that selection of the OK and Cancel buttons on other screens shown in Figures herein operate in a similar manner. FIG. 12 shows a screen 1200 displayed upon selection of the rules tab 1102 of FIG. 11. From here, rules relating to the particular object(s) can be edited.

Figure 13:
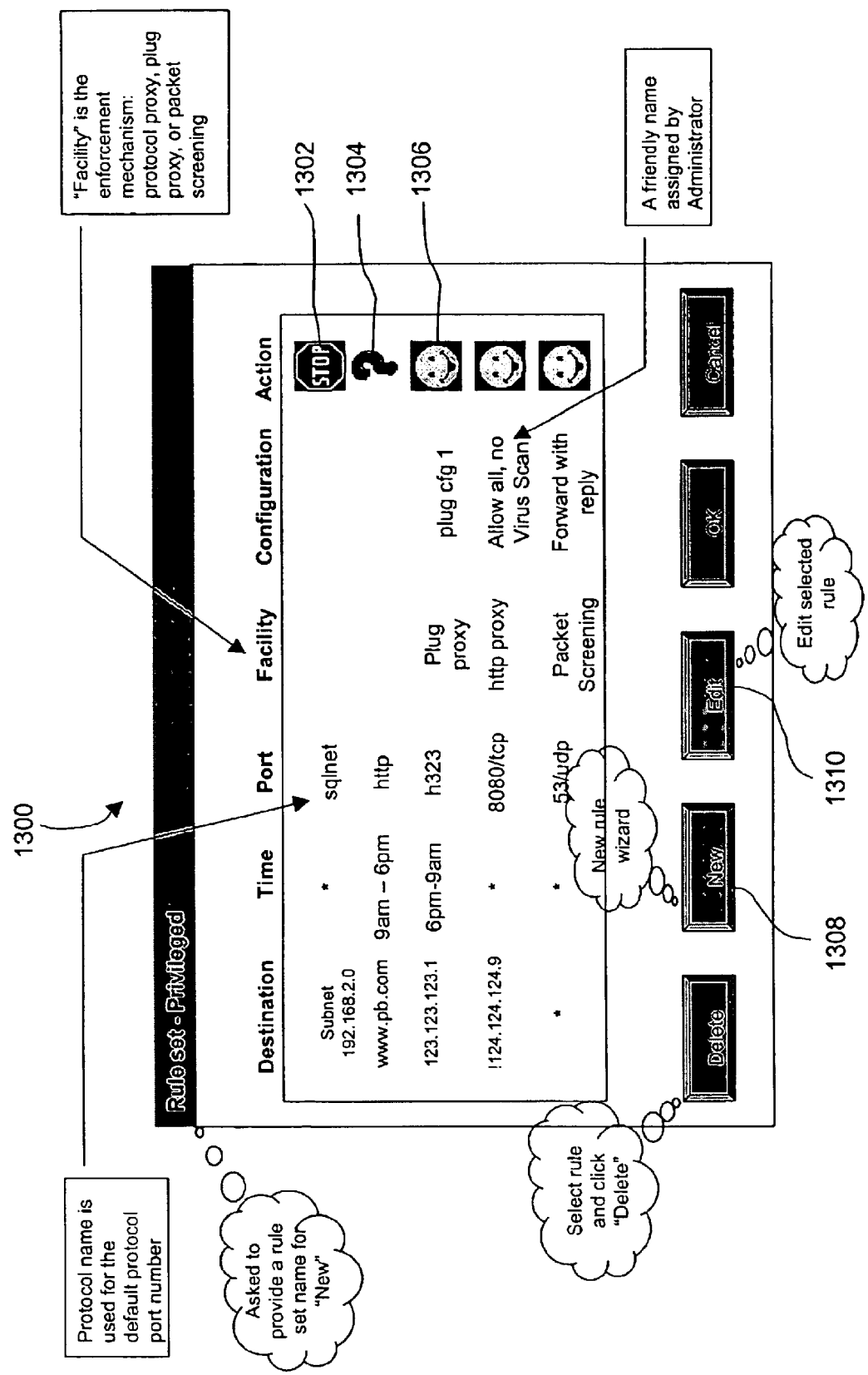
FIG. 13 illustrates a graphical user interface for creating and editing rule sets.
Figure 15:
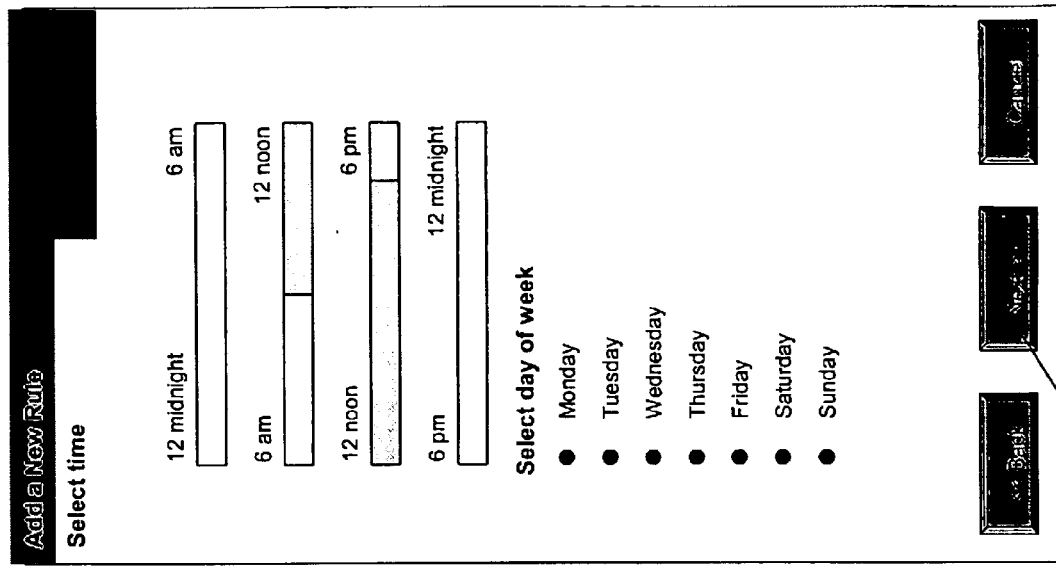
FIG. 15 illustrates a graphical user interface for configuring a new rule to a rule set.

FIG. 13 illustrates a screen 1300 for creating and editing rule sets. As shown, the destination, time limits, protocol (port), facility, configuration, and rule action of each rule in the rule set are displayed. The action of a particular rule can be represented by an icon. Here, a stop icon 1302 represents a deny action. An icon 1304 with a question mark represents a conditional deny action. A smiling icon 1306 represents a permit action. By selecting the New button 1308, the user can add new rules. Upon selecting a rule, such as by clicking on a line, and pressing the edit button 1310, the user is allowed to edit the parameters of the rule.

Figure 14:
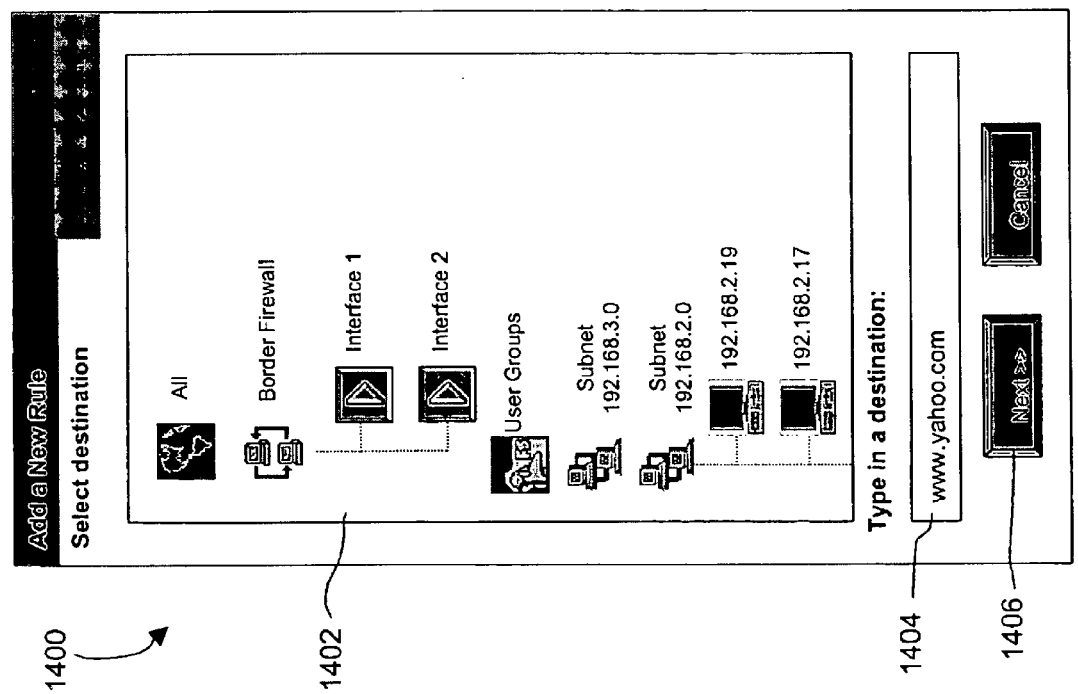
FIG. 14 illustrates a graphical user interface for configuring a new rule being added to a rule set.
Figure 18:
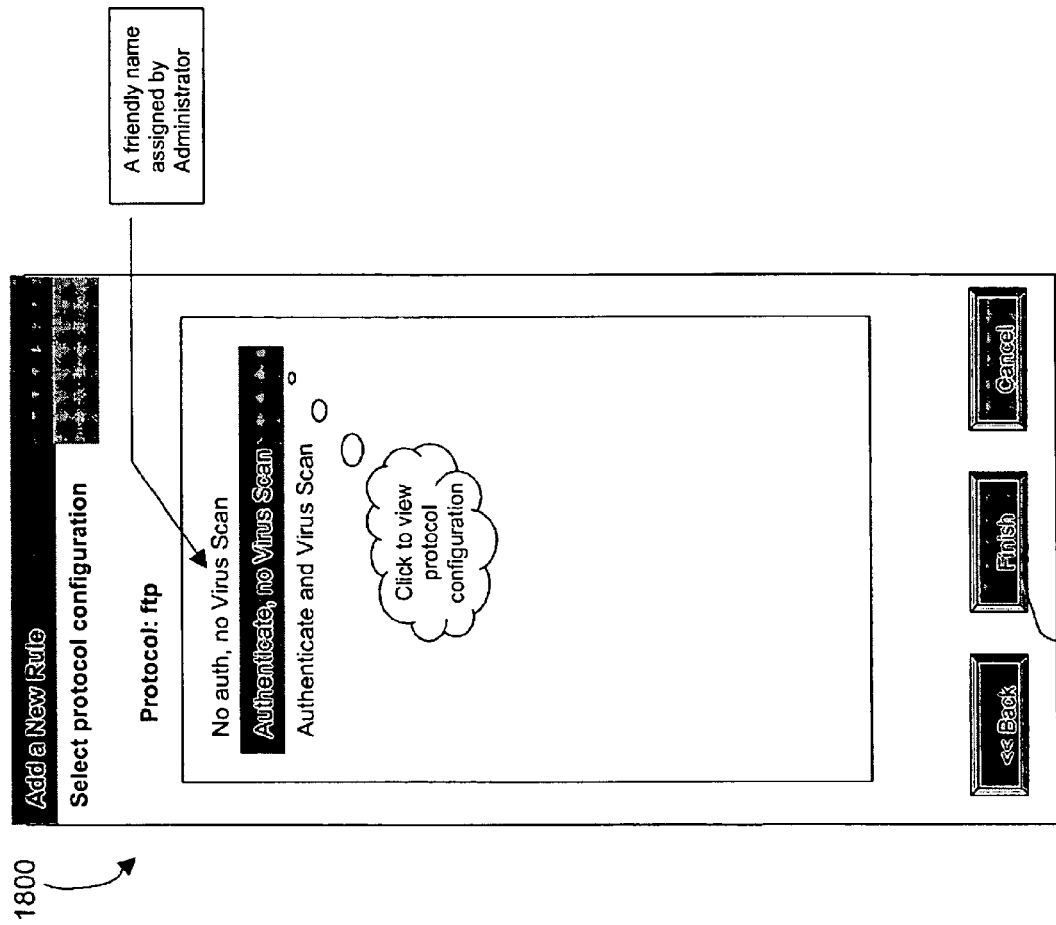
FIG. 18 illustrates a graphical user interface for configuring a new rule to a rule set.

FIG. 14 illustrates a screen 1400 for configuring a new rule when adding a new rule to a rule set. Such screen is displayed upon selection of the New button of FIG. 13 or the New Rule icon of FIGS. 9 and 10. The user can select a destination from the icon box 1402 or can enter one in the destination entry field 1404. The user then selects the Next button 1406. The user then selects the time and days of the week that the rule is in effect (or not in effect) on the screen 1500 of FIG. 15 and selects the Next button 1502. The screen 1600 of FIG. 16 is displayed. Here, the user selects the mechanism that enforces the rule from the facility field 1602, enters the port number (optionally) and selects the transport protocol. The user then selects the Next button.

FIG. 17 depicts a screen 1700 that allows selection of an action for the rule. Upon selection of the desired rule action, the Next button is selected. The user is allowed to select a protocol configuration on the screen 1800 shown in FIG. 18. Upon making the selection, the user selects the Finish button 1802 and the rule is added to the rule set or the edits are made to the rule.

Figures 19, 20:
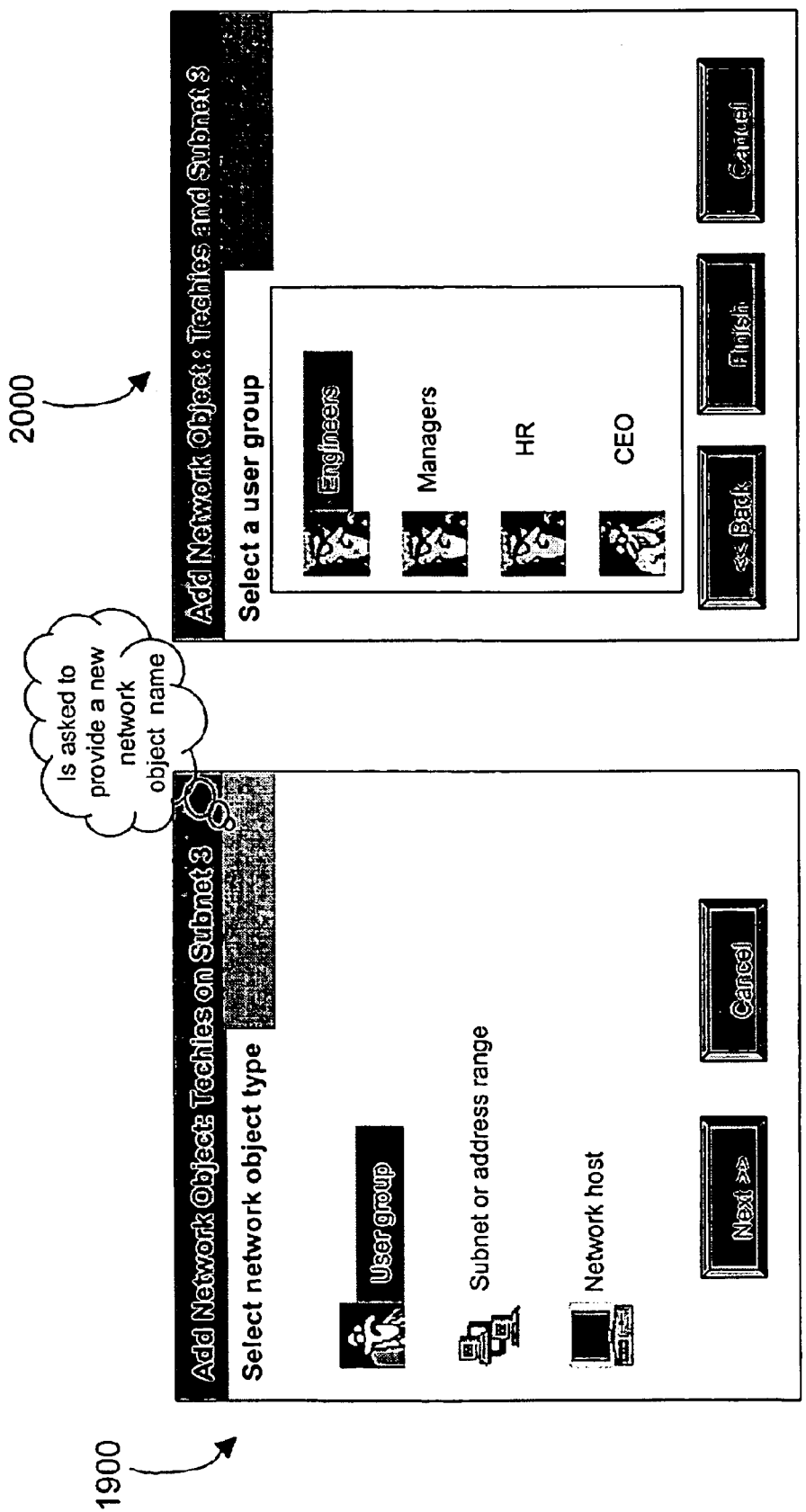
FIG. 19 illustrates a graphical user interface for adding a network object.
FIG. 20 illustrates a graphical user interface for adding a network object.

FIGS. 19 and 20 illustrate screens for adding a network object. FIG. 19 illustrates a screen 1900 for selecting a type of the network object. The object type is selected and the Next button is selected to display the user group screen 2000, shown in FIG. 20. Upon selection of the user group, the Finish button is selected to save the network object.

Figure 22:
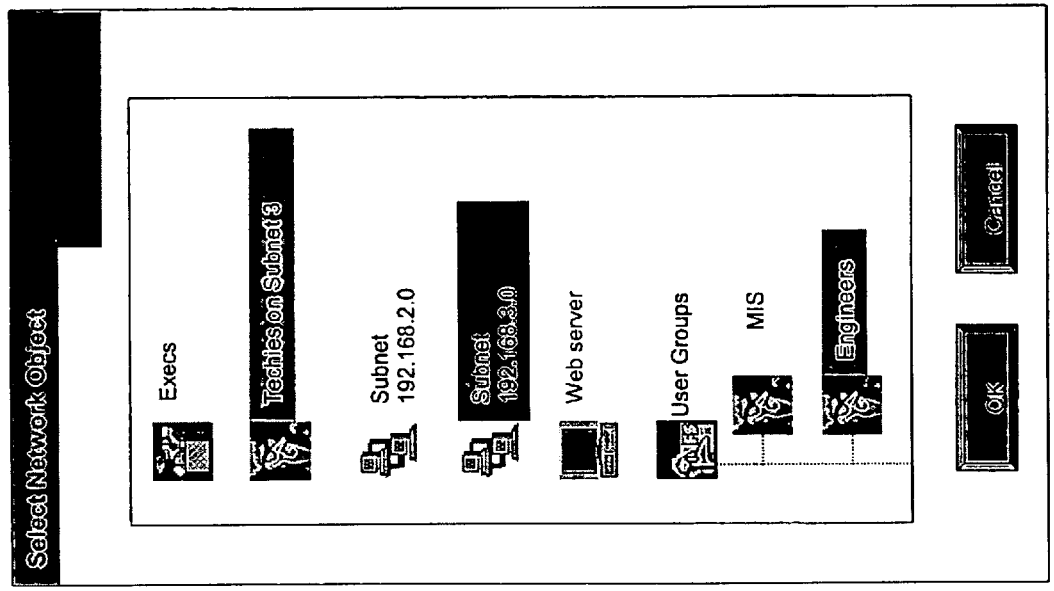
FIG. 22 illustrates a graphical user interface for editing a network object.
Figure 21:
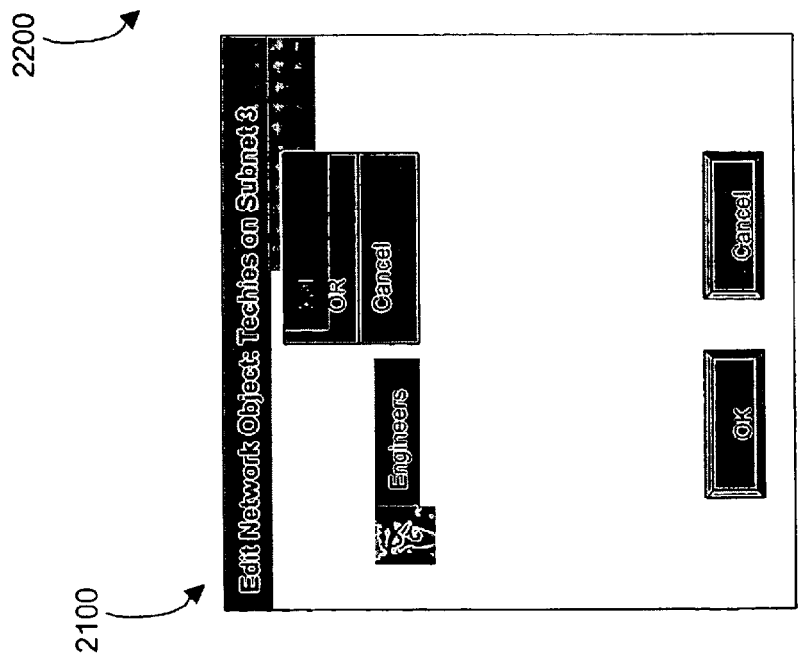
FIG. 21 illustrates a graphical user interface for editing a network object.
Figure 23:
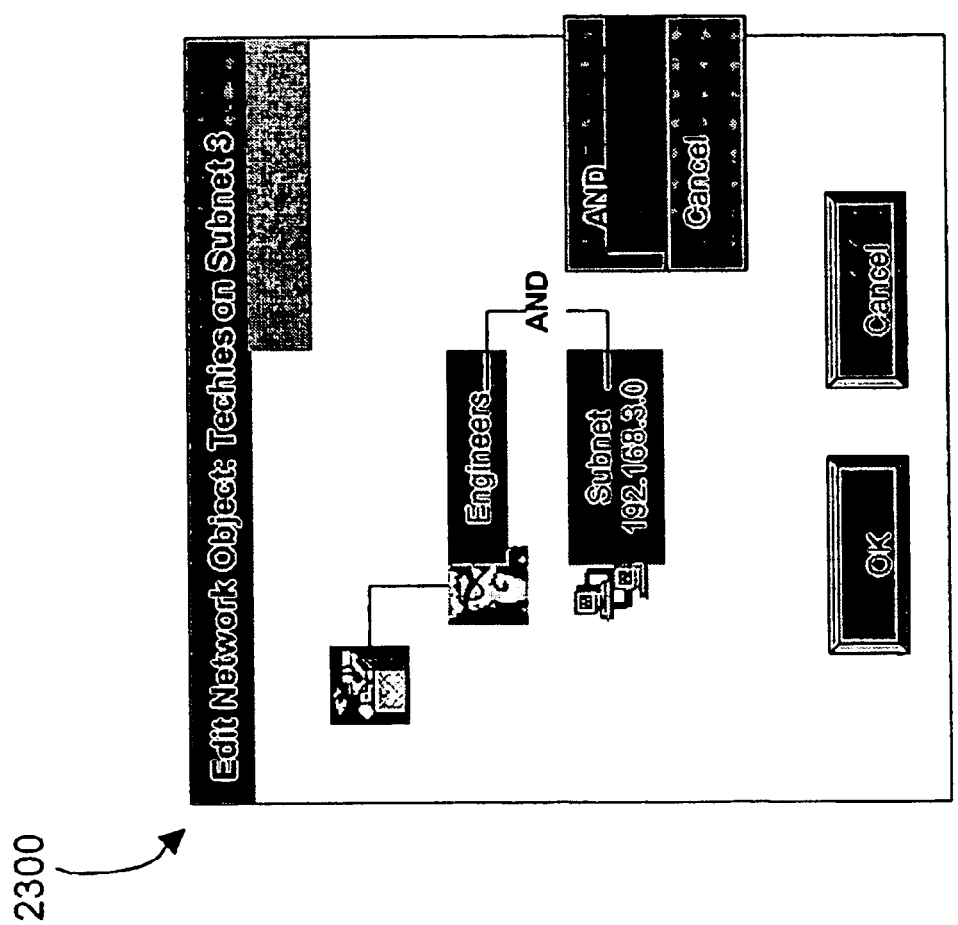
FIG. 23 illustrates a graphical user interface for editing a network object.

FIGS. 21-23 illustrate screens for editing a network object. The screen 2100 of FIG. 21 displays the selected network object. FIG. 22 depicts a screen 2200 that allows selection of the other network object(s) that will be associated with the object shown in FIG. 21. FIG. 23 illustrates a screen 2300 that allows creation of the relationship between the selected network objects, here an and/or relationship.

Accordingly, the present network policy management model combines the familiar rule-based policy specification with the advanced network topology based policy representation. Simple policy rules syntax and semantics hide the complexity of the policy specification from the Administrator by aggregating policy fragments in a complete network policy. Thus, the rule-based models achieve the following objectives:

- policy rule specification is separated from the network objects specification allowing a modular way of creating network policies
- policy rule sets could be unambiguously merged allowing a smaller and more manageable set of the basic policies
- allows for a simple "drag-and-drop" user interface
- supports defining policies based on the source user name and IP addresses, destination IP addresses or DNS names, and the network protocols
- supports the notion of the intersecting network objects (e.g. a user belongs to more than one user group) and allows determination of a policy for the elements in the intersecting subset
- allows easy policy amendment for a single object (user, IP address) which previously had no policy of its own
- allows imposition of a global mode of the firewall operation in a single step by supporting the global source network object.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for providing network security features, comprising:

identifying a plurality of network objects;

retrieving rule sets associated with at least one of the identified network objects, the rule sets including a plurality of policy rules that govern actions relating to the identified network objects;

reconciling overlapping policy rules of the rule sets amongst the network objects; and executing the reconciled rule sets;

wherein the rule sets are combined into a single rule set, and duplicate policy rules of the rule sets are removed;

wherein a user is notified of conflicting policy rules of the rule sets;

wherein included is a first graphical user interface that allows a user to associate the network objects with the rule sets, a second graphical user interface that allows the user to create associations of the rule sets and the network objects for a firewall, a third graphical user interface that is displayed upon selection of a network object, a fourth graphical user interface for creating and editing the rule sets, a fifth graphical user interface for configuring a new policy rule for being added to one of the rule sets, a sixth graphical user interface for adding a new network object, and a seventh graphical user interface for editing one of the network objects.

2. The method as recited in claim 1, wherein each policy rule of the reconciled rule sets includes a rule action selected from the group consisting of: permitting an action relating to the identified network objects, denying an action relating to the identified network objects, and conditionally denying an action relating to the identified network objects.

3. The method as recited in claim 2, wherein an action relating to the identified network objects is permitted if no policy rules deny the action, at least one policy rule conditionally denies the action, and at least one policy rule permits the actions.

4. The method as recited in claim 2, wherein the policy rules denying the action are evaluated first, the policy rules conditionally denying the action are evaluated second, and the policy rules permitting the action are evaluated third.

5. The method as recited in claim 1, wherein an action relating to the identified network objects is denied if none of the policy rules permit the action.

6. The method as recited in claim 1, wherein an action relating to the identified network objects is denied if none of the policy rules match a request for the action.

7. The method as recited in claim 1, wherein the rule sets are associated with a particular network object.

8. The method as recited in claim 1, wherein a protocol configuration enforced by a related proxy is selected from a hierarchal list if an action is permitted by more than one rule.

9. A computer program product for providing network security features, comprising:
(a) computer code for identifying a plurality of network objects;
(b) computer code for retrieving rule sets associated with at least one of the identified network objects, the rule sets including a plurality of policy rules that govern actions relating to the identified network objects;
(c) computer code for reconciling overlapping policy rules of the rule sets amongst the network objects; and
(d) computer code for executing the reconciled rule sets;
wherein the rule sets are combined into a single rule set, and duplicate policy rules of the rule sets are removed;
wherein a user is notified of conflicting policy rules of the rule sets;
wherein included is a first graphical user interface that allows a user to associate the network objects with the rule sets, a second graphical user interface that allows the user to create associations of the rule sets and the network objects for a firewall, a third graphical user interface that is displayed upon selection of a network object, a fourth graphical user interface for creating and editing the rule sets, a fifth graphical user interface for configuring a new policy rule for being added to one of the rule sets, a sixth graphical user interface for adding a new network object, and a seventh graphical user interface for editing one of the network objects.

10. The computer program product as recited in claim 9, wherein each policy rule of the reconciled rule sets includes a rule action selected from the group consisting of: permitting an action relating to the identified network objects, denying an action relating to the identified network objects, and conditionally denying an action relating to the identified network objects.

11. The computer program product as recited in claim 10, wherein an action relating to the identified network objects is permitted if no policy rules deny the action, at least one policy rule conditionally denies the action, and at least one policy rule permits the action.

12. The computer program product as recited in claim 10, wherein the policy rules denying the action are evaluated first, the policy rules conditionally denying the action are evaluated second, and the policy rules permitting the action are evaluated third.

13. The computer program product as recited in claim 9, wherein an action relating to the identified network objects is denied if none of the policy rules permit the action.

14. The computer program product as recited in claim 9, wherein an action relating to the identified network objects is denied if none of the policy rules match a request for the action.

15. The computer program product as recited in claim 9, wherein the rule sets are associated with a particular network object.

16. The computer program product as recited in claim 9, wherein a protocol configuration enforced by a related proxy is selected from a hierarchal list if an action is permitted by more than one rule.

17. A rule based network security system for providing network security features, comprising:
(a) logic for identifying a plurality of network objects;
(b) logic for retrieving rule sets associated with at least one of the identified network objects, the rule sets including a plurality of policy rules that govern actions relating to the identified network objects;
(c) logic for reconciling overlapping policy rules of the rule sets amongst the network objects; and
(d) logic for executing the reconciled rule sets;
wherein the rule sets are combined into a single rule set, and duplicate policy rules of the rule sets are removed;
wherein a user is notified of conflicting policy rules of the rule sets;
wherein included is a first graphical user interface that allows a user to associate the network objects with the rule sets, a second graphical user interface that allows the user to create associations of the rule sets and the network objects for a firewall, a third graphical user interface that is displayed upon selection of a network object, a fourth graphical user interface for creating and editing the rule sets, a fifth graphical user interface for configuring a new policy rule for being added to one of the rule sets, a sixth graphical user interface for adding a new network object, and a seventh graphical user interface for editing one of the network objects.

18. A method for establishing network security, comprising the steps of:
(a) providing a plurality of network objects of a network and a plurality of rule sets; and
(b) associating the network objects with the rule sets;
(c) wherein the rule sets include a plurality of policy rules that govern actions relating to the identified network objects during operation of the network;
wherein included is at least three graphical user interfaces selected from the group consisting of a first graphical user interface that allows a user to associate the network objects with the rule sets, a second graphical user interface that allows the user to create associations of the rule sets and the network objects for a firewall, a third graphical user interface that is displayed upon selection of a network object, a fourth graphical user interface for creating and editing the rule sets, a fifth graphical user interface for configuring a new policy rule for being added to one of the rule sets, a sixth graphical user interface for adding a new network object, and a seventh graphical user interface for editing one of the network objects.

19. The method as recited in claim 18, wherein each policy rule of the reconciled rule sets includes a rule action selected from the group consisting of: permitting an action relating to the identified network objects, denying an action relating to the identified network objects, and conditionally denying an action relating to the identified network objects.

20. The method as recited in claim 19, wherein an action relating to the identified network objects is permitted if no policy rules deny the action, at least one policy rule conditionally denies the action, and at least one policy rule permits the action.

21. The method as recited in claim 18, wherein an action relating to the identified network objects is denied if none of the policy rules permit the action.

22. A computer program product for establishing network security, comprising:
(a) computer code for providing a plurality of network objects of a network and a plurality of rule sets; and
(b) computer code for associating the network objects with the rule sets;
(c) wherein the rule sets include a plurality of policy rules that govern actions relating to the identified network objects during operation of the network;
wherein a plurality of the rule sets are combined into a single rule set, and duplicate policy rules of the rule sets are removed;
wherein a user is notified of conflicting policy rules of the rule sets;
wherein included is a first graphical user interface that allows a user to associate the network objects with the rule sets, a second graphical user interface that allows the user to create associations of the rule sets and the network objects for a firewall, a third graphical user interface that is displayed upon selection of a network object, a fourth graphical use interface for creating and editing the rule sets, a fifth graphical user interface for configuring a new policy rule for being added to one of the rule sets, a sixth graphical user interface for adding a new network object, and a seventh graphical user interface for editing one of the network objects.

23. The computer program product as recited in claim 22, wherein each policy rule of the reconciled rule sets includes a rule action selected from the group consisting of: permitting an action relating to the identified network objects, denying an action relating to the identified network objects, and conditionally denying an action relating to the identified network objects.

24. The computer program product as recited in claim 23, wherein an action relating to the identified network objects is permitted if no policy rules deny the action, at least one policy rule conditionally denies the action, and at least one policy rule permits the, action.

25. The computer program product as recited in claim 22, wherein an action relating to the identified network objects is denied if none of the policy rules permit the action.

26. A method for providing network security features, comprising the step of:
(a) identifying a plurality of network objects;
(b) retrieving rule sets associated with at least one of the identified network objects, the rule sets including a plurality of policy rules that govern actions relating to the identified network objects;
(c) reconciling overlapping policy rules of the rule sets amongst the network objects; and
(d) executing the reconciled rule sets;
wherein the rule sets are combined into a single rule set, and duplicate policy rules of the rule sets are removed;
wherein a user is notified of conflicting policy rules of the rule sets;
wherein included is a first graphical user interface that allows a user to associate the network objects with the rule sets, a second graphical user interface that allows the user to create associations of the rule sets and the network objects for a firewall, a third graphical user interface that is displayed upon selection of a network object, a fourth graphical user interface for creating and editing the rule sets, a fifth graphical user interface for configuring a new policy rule for being added to one of the rule sets, a sixth graphical user interface for adding a new network object, and a seventh graphical user interface for editing one of the network objects.

* * * * *